(12) United States Patent
Maeda et al.

(10) Patent No.: US 12,368,769 B2
(45) Date of Patent: *Jul. 22, 2025

(54) SYSTEM, METHOD, AND SERVICER DEVICE WHICH TRANSMIT NAME INFORMATION

(71) Applicant: Ricoh Company, Ltd., Tokyo (JP)

(72) Inventors: Kaoru Maeda, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,483

(22) Filed: Mar. 5, 2024

(65) Prior Publication Data

US 2024/0251006 A1    Jul. 25, 2024

Related U.S. Application Data

(63) Continuation of application No. 17/839,522, filed on Jun. 14, 2022, now Pat. No. 11,956,301, which is a (Continued)

(30) Foreign Application Priority Data

Aug. 1, 2012  (JP) .................. 2012-171192

(51) Int. Cl.
*G06F 15/16* (2006.01)
*H04L 12/18* (2006.01)
(Continued)

(52) U.S. Cl.
CPC .......... *H04L 67/02* (2013.01); *H04L 12/1818* (2013.01); *H04L 61/4505* (2022.05);
(Continued)

(58) Field of Classification Search
CPC ..... H04L 67/02; H04L 61/59; H04L 61/4505; H04L 65/403; H04L 65/1093
See application file for complete search history.

(56) References Cited

U.S. PATENT DOCUMENTS 8,769,001 B2   7/2014   Ohwada
8,782,229 B2   7/2014   Umehara
(Continued)

FOREIGN PATENT DOCUMENTS

EP   3 014 809 A1   5/2016
JP   08-195820 A    7/1996
(Continued)

OTHER PUBLICATIONS

International Search Report Issued Aug. 27, 2013 in PCT/JP13/070953 filed Jul. 26, 2013.
(Continued)

*Primary Examiner* — Yves Dalencourt
(74) *Attorney, Agent, or Firm* — XSENSUS LLP

(57) ABSTRACT

A transmission management system includes a destination name data managing unit which manages a plurality of destination name data items which indicate a plurality of names of a destination in communications between transmission terminals, a destination name data reading unit which reads a destination name data item from the plurality of destination name data items managed by the destination name data managing unit, and a destination name data transmitting unit which transmits the destination name data item read by the destination name data reading unit to a transmission terminal capable of communicating with the destination.

19 Claims, 22 Drawing Sheets

Related U.S. Application Data continuation of application No. 17/104,322, filed on Nov. 25, 2020, now Pat. No. 11,516,278, which is a continuation of application No. 16/291,842, filed on Mar. 4, 2019, now Pat. No. 10,904,315, which is a continuation of application No. 15/290,917, filed on Oct. 11, 2016, now Pat. No. 10,270,837, which is a continuation of application No. 14/417,868, filed as application No. PCT/JP2013/070953 on Jul. 26, 2013, now Pat. No. 9,661,057.

(51) Int. Cl.
   *H04L 61/4505*     (2022.01)
   *H04L 65/1093*    (2022.01)
   *H04L 65/403*      (2022.01)
   *H04L 67/02*       (2022.01)
   *H04M 3/56*        (2006.01)
   *H04N 7/15*        (2006.01)
   *H04L 61/59*       (2022.01)

(52) U.S. Cl.
   CPC ........ *H04L 65/1093* (2013.01); *H04L 65/403* (2013.01); *H04M 3/563* (2013.01); *H04N 7/15* (2013.01); *H04L 61/59* (2022.05); *H04M 3/565* (2013.01)

(56) References Cited

U.S. PATENT DOCUMENTS

| | | | |
|---|---|---|---|
| 9,661,057 | B2 | 5/2017 | Maeda et al. |
| 11,956,301 | B2 * | 4/2024 | Maeda .................. H04M 3/563 |
| 2002/0138650 | A1 | 9/2002 | Yamamoto et al. |
| 2007/0086065 | A1 | 4/2007 | Wada |
| 2009/0094694 | A1 | 4/2009 | Kodaira |
| 2009/0177974 | A1 | 7/2009 | Cox et al. |
| 2012/0140022 | A1 | 6/2012 | Kato et al. |
| 2013/0242038 | A1 | 9/2013 | Umehara et al. |
| 2013/0278712 | A1 | 10/2013 | Maeda et al. |
| 2016/0127686 | A1 | 5/2016 | Nagase et al. |

FOREIGN PATENT DOCUMENTS

| | | |
|---|---|---|
| JP | 10-276236 A | 10/1998 |
| JP | 2005-202891 A | 7/2005 |
| JP | 2007-122331 A | 5/2007 |
| JP | 2011-164488 A | 8/2011 |
| JP | 2011-205612 A | 10/2011 |
| JP | 2012-50063 A | 3/2012 |
| JP | 2012-134944 A | 7/2012 |
| JP | 2012-138893 A | 7/2012 |
| JP | 2012-147416 A | 8/2012 |
| JP | 2012-195926 A | 10/2012 |
| WO | 2012/086844 A1 | 6/2012 |
| WO | 2014/208569 A1 | 12/2014 |

OTHER PUBLICATIONS

Extended European Search Report issued Jul. 9, 2015 in Patent Application No. 13826383.5.

O. Novo, et al., "Conference Information Data Model for Centralized Conferencing (XCON)" Internet Engineering Task Force (IETF), XP015081466, 2012, pp. 1-94.

Office Action mailed Nov. 17, 2016 in co-pending U.S. Appl. No. 14/417,868.

Extended European Search Report issued Aug. 9, 2018 in Patent Application No. 18172517.7, 14 pages.

Office Action mailed Nov. 13, 2018 in Japanese Application No. 2018-002312.

\* cited by examiner

FIG.7

| RELAY DEVICE ID | RELAY DEVICE IP ADDRESS |
|---|---|
| 111a | 1.2.1.2 |
| 111b | 1.2.2.2 |
| 111c | 1.3.1.2 |
| 111d | 1.3.2.2 |

FIG.8

| TERMINAL ID | PASSWORD |
|---|---|
| 01aa | aaaa |
| 01ab | abab |
| 01ba | baba |
| ... | ... |

FIG.9

| SESSION ID | RESERVATION ID | RELAY DEVICE ID | TERMINAL ID |
|---|---|---|---|
| se01 | rsv02 | 111a | 01ba, 01db |
| se02 | rsv06 | 111b | 01bd |
| se03 | rsv08 | 111c | 01ae, 01dc |
| ... | ... | ... | ... |

FIG.10

| SOURCE TERMINAL ID | DESTINATION TERMINAL ID | DESTINATION NAME DATA (FIRST DST NAME DATA) |
|---|---|---|
| 01aa | 01ab | XX SALES PROJECT TEAM |
| 01aa | 01ba | OSAKA YY PLANNING TEAM |
| 01aa | 01bb | OSAKA ZZ SALES TEAM |
| 01aa | 01ca | COMPANY B, NEW YORK |
| 01aa | 01db | COMPANY B, WASHINGTON D.C |
| ... | ... | ... |
| 01ba | 01aa | TOKYO KK SALES PROJECT TEAM |
| 01ba | 01db | COMPANY B, WASHINGTON D.C. |
| ... | ... | ... |
| 01db | 01aa | TOKYO HQ, A INC. |
| 01db | 01ba | OSAKA BO, A INC. |
| 01db | 01ca | LL DEVELOPMENT, NEW YORK |
| ... | ... | ... |

FIG.11A

| RSVN ID | START DATE/TIME | END DATE/TIME | MEETING NAME |
|---|---|---|---|
| rsv01 | 2011/11/10 10:00 | 2011/11/10 11:30 | SALES MEETING |
| rsv02 | 2011/11/10 13:30 | 2011/11/10 14:50 | MONTHLY MEETING (NOV.) |
| rsv03 | 2011/11/10 15:00 | 2011/11/10 17:00 | SECURITY MEETING |
| ... | ... | ... | ... |

FIG.11B

| RSVN ID | TERMINAL ID | DESTINATION NAME DATA (SECOND DSTN NAME DATA) |
|---|---|---|
| rsv01 | 01aa | TOKYO KK SALES PROJECT TEAM |
| rsv01 | 01ba | OSAKA YY PLANNING TEAM |
| rsv02 | 01aa | TOKYO |
| rsv02 | 01ba | OSAKA |
| rsv02 | 01db | WASHINGTON D.C. |
| ... | ... | ... |

FIG.12

| TERMINAL ID | OPERATING STATE | IP ADDRESS | DESTINATION NAME DATA (THIRD DSTN NAME DATA) |
|---|---|---|---|
| 01aa | ONLINE | 1.2.1.3 | 03-1234-○○○○ |
| 01ab | DURING MTG | 1.2.1.4 | 03-1234-△△△△ |
| ... | ... | ... | ... |
| 01ba | DURING MTG | 1.2.2.3 | 06-1234-○○○○ |
| 01bb | ONLINE | 1.2.2.4 | 06-1234-△△△△ |
| ... | ... | ... | ... |
| 01ca | OFF LINE | 1.3.1.3 | 212-123-○○○○ |
| 01cb | ONLINE | 1.3.1.4 | 212-123-△△△△ |
| ... | ... | ... | ... |
| 01da | DURING MTG | 1.3.2.3 | 202-123-○○○○ |
| 01db | DURING MTG | 1.3.2.4 | 202-123-△△△△ |
| ... | ... | ... | ... |

FIG.15A

| RSVN ID | START DATE/TIME | END DATE/TIME | MEETING NAME |
|---|---|---|---|
| rsv01 | 2011/11/10 10:00 | 2011/11/10 11:30 | SALES MEETING |
| rsv02 | 2011/11/10 13:30 | 2011/11/10 14:50 | MONTHLY MEETING (NOV.) |

FIG.15B

| TERMINAL ID | OPERATING STATE | DESTINATION NAME DATA |
|---|---|---|
| 01ab | DURING MEETING | XX SALES PROJECT TEAM |
| 01ba | DURING MEETING | OSAKA YY PLANNING TEAM |
| 01bb | ONLINE | OSAKA ZZ SALES TEAM |
| 01ca | OFF LINE | COMPANY B, NEW YORK |
| 01db | DURING MEETING | COMPANY B, WASHINGTON D.C. |

FIG.21

| RSVN ID | START DATE/TIME | END DATE/TIME | MEETING NAME | TERMINAL ID | OPERATING STATE | DESTINATION NAME DATA |
|---|---|---|---|---|---|---|
| rsv02 | 2011/11/10 13:30 | 2011/11/10 14:50 | MONTHLY MEETING (NOV.) | 01aa | ONLINE | TOKYO |
| | | | | 01ba | DURING MEETING | OSAKA |
| | | | | 01db | DURING MEETING | WASHINGTON D. C. |

SYSTEM, METHOD, AND SERVICER DEVICE WHICH TRANSMIT NAME INFORMATION

CROSS-REFERENCE TO RELATED APPLICATIONS

This application is a continuation of U.S. application Ser. No. 17/839,522, filed Jun. 14, 2022, which is a continuation of U.S. application Ser. No. 17/104,322, filed Nov. 25, 2020 (now U.S. Pat. No. 11,516,278 issued Nov. 29, 2022), which is a continuation of and claims the benefit of priority under 35 U.S.C. § 120 from U.S. application Ser. No. 16/291,842 filed Mar. 4, 2019 (now U.S. Pat. No. 10,904,315 issued Jan. 26, 2021), which is a continuation of U.S. application Ser. No. 15/290,917 filed Oct. 11, 2016 (now U.S. Pat. No. 10,270,837 issued Apr. 23, 2019), which is continuation of U.S. application Ser. No. 14/417,868 filed Jan. 28, 2015 (now U.S. Pat. No. 9,661,057 issued May 23, 2017), which is a National Stage of PCT/JP2013/070953 filed Jul. 26, 2013, which claims the benefit of priority under 35 U.S.C. § 119 to Japanese Patent Application No. 2012-171192 filed Aug. 1, 2012, the entire contents of each of which are hereby incorporated herein by reference.

TECHNICAL FIELD

The present invention relates to a transmission management system which transmits destination name data in communications between transmission terminals to a transmission terminal in the transmission management system.

BACKGROUND ART

Recently, with the demand for reducing time and expenses for business trips, a videoconference system is becoming increasingly popular. The videoconference system is an example of a transmission system which communicates over a communication network, and conducts videoconferences via the communication network such as the Internet. In the videoconference system, the videoconference may be implemented by transmitting and receiving content data, such as image data and voice data, between the terminals (each of which is an example of a transmission terminal).

In the related art, a method of establishing a session between terminals for the communication such as the videoconference is known. In this method, a destination name is selected from among various names of destinations (candidates for destinations) contained in a destination list and establishment of the session is requested. See Japanese Laid-Open Patent Publication No. 2012-050063.

In the known method, a transmission management system which controls the starting of the communication generates a destination list in which the names of the destinations (the candidates) are contained and transmits the destination list to a transmission terminal, and prompting a user on the transmission terminal to select one of the destination names in the designation list.

Generally, geographical names such as "Japan", office names such as "Tokyo office", or terminal names such as "AB terminal" have been used as the names of the destinations managed by the transmission management system.

DISCLOSURE OF THE INVENTION

Problems to be Solved by the Invention

However, the easy-to-specify names of the destinations may vary depending on the communications. For example, in the videoconference in the same organization, if team names in the organization are used as the destination names, such names may become easy-to-specify ones. Or, in the videoconference between different organizations, if company names are used as the destination names, the company names may become easy-to-specify ones.

In the transmission system according to the related art, the common names which are provided for users have been used as the names of the destinations, and it is impossible to use the easy-to-specify names of the destinations in the communications.

DISCLOSURE OF THE INVENTION

In one aspect, the present disclosure provides a transmission system and a transmission management system which substantially eliminate one or more problems caused by the limitations and disadvantages of the related art.

In one embodiment, the present disclosure provides a transmission management system including: a destination name data managing unit configured to manage a plurality of destination name data items which indicate a plurality of names of a destination in communications between transmission terminals; a destination name data reading unit configured to read at least one destination name data item from among the plurality of destination name data items managed by the destination name data managing unit; and a destination name data transmitting unit configured to transmit the at least one destination name data item read by the destination name data reading unit, to a transmission terminal which is capable of communicating with the destination.

BRIEF DESCRIPTION OF THE DRAWINGS

Other objects, features and advantages of embodiments will be apparent from the following detailed description when read in conjunction with the accompanying drawings.

FIG. 7 is a conceptual diagram showing a relay device management table.

FIG. 8 is a conceptual diagram showing a terminal authentication management table.

FIG. 9 is a conceptual diagram showing a session management table.

FIG. 10 is a conceptual diagram showing a destination list management table.

FIG. 11A is a conceptual diagram showing a reservation management table.

FIG. 11B is a conceptual diagram showing a reservation terminal management table.

FIG. 12 is a conceptual diagram showing a terminal management table.

FIG. 15A is a conceptual diagram showing an example of meeting information.

FIG. 15B is a conceptual diagram showing an example of destination information.

FIG. 21 is a conceptual diagram showing an example of meeting detailed information.

MODE FOR CARRYING OUT THE INVENTION

Overall Configuration of Embodiment

Figure 1:
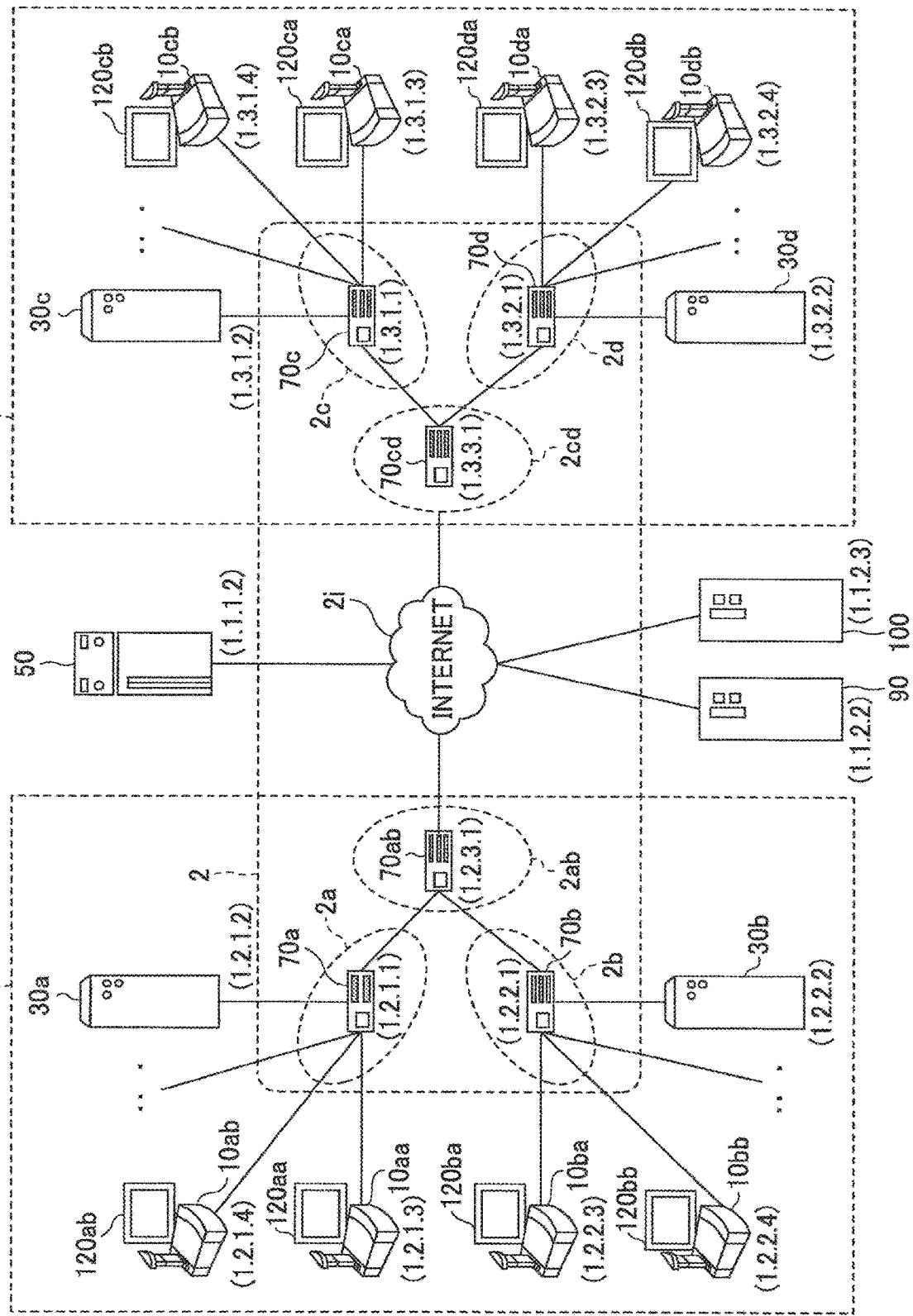
FIG. 1 is a schematic diagram showing a transmission system according to an embodiment.
Figure 2:
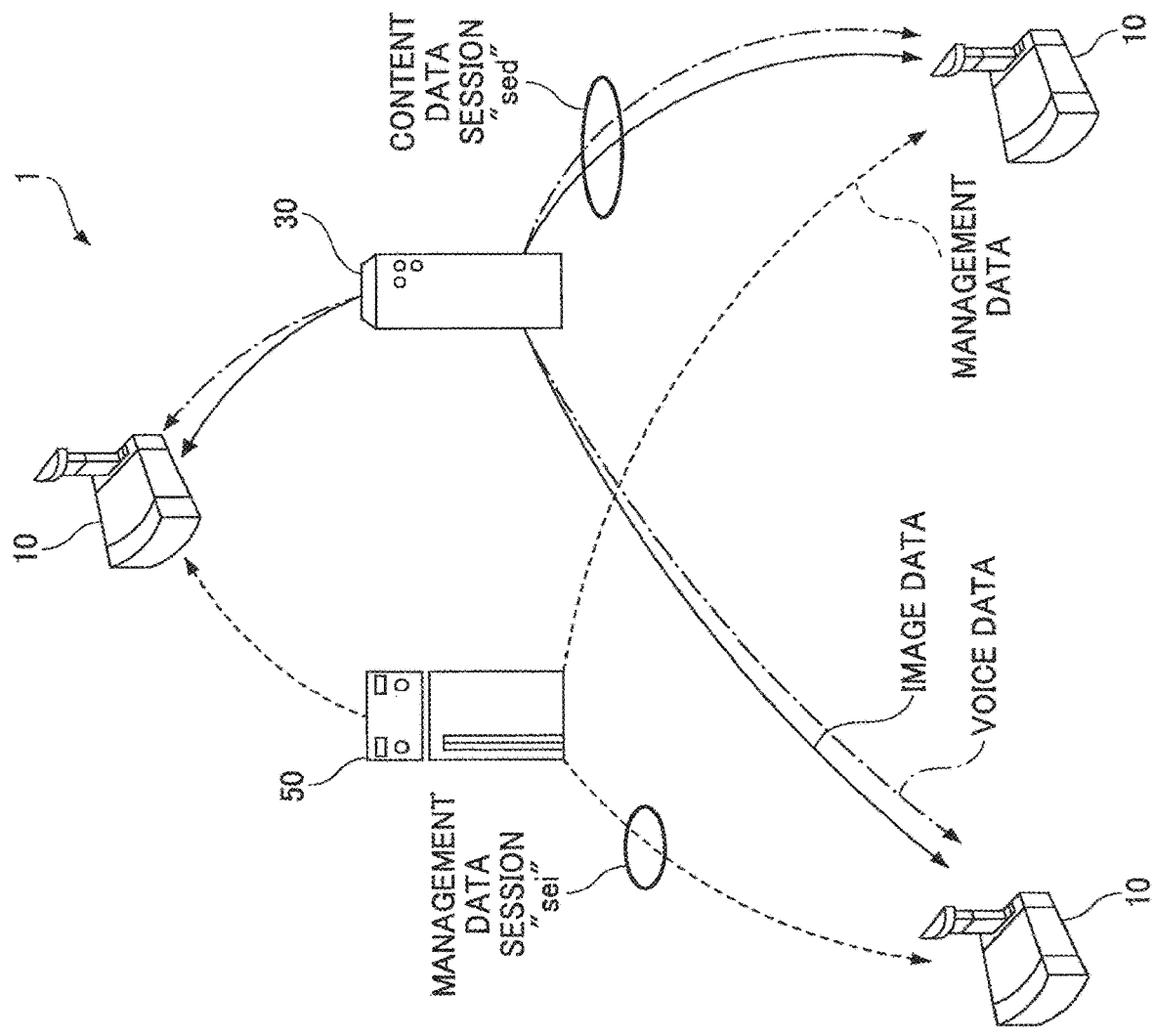
FIG. 2 is a conceptual diagram showing sessions of transmitting and receiving of image data, voice data and management data in the transmission system according to the embodiment.

In the following, a description will be given of preferred embodiments with reference to the accompanying drawings. First, the whole configuration of a transmission system according to an embodiment will be described with reference to FIGS. 1 and 2. FIG. 1 is a schematic diagram showing the transmission system according to the embodiment. FIG. 2 is a conceptual diagram showing sessions of transmitting and receiving of image data, voice data and management data in the transmission system according to the embodiment.

There are various types of transmission systems. One example may be a data provision system which transmits content data from a transmission terminal to another transmission terminal via a transmission management system in one way. Another example may be a communication system which mutually communicates information or emotional expressions among two or more transmission terminals via the transmission management system. This communication system is used for mutually exchanging information or emotional expressions among the two or more communication terminals (i.e., the transmission terminals) via a communication management system (i.e., the transmission management system). Examples of the communication system include a videoconference system, a visual telephone system, an audio conference system, a voice-call system, and a personal computer screen sharing system.

The following embodiments describe the transmission system, the transmission management system, and the transmission terminal by conceptualizing the videoconference system as an example of the communication system, the videoconference management system as an example of the communication management system, and the videoconference terminal as an example of the communication terminal, respectively. Namely, the transmission terminal and the transmission management system according to this embodiment may be applied not only to the videoconference system, but may also be applied to the communication system or the transmission system. In the following embodiments, the videoconference may also be called the meeting.

As shown in FIG. 1, the transmission system 1 includes two or more transmission terminals (10aa, 10ab, . . . ), two or more displays (120aa, 120ab, . . . ) for the respective transmission terminals (10aa, 10ab, . . . ), two or more relay devices (30a, 30b, 30c, 30d), a transmission management system 50, a program provision system 90, and a maintenance system 100.

Note that, in the following, any one of the transmission terminals (10aa, 10ab, . . . ) may be called a transmission terminal 10, any one of the displays (120aa, 120ab, . . . ) may be called a display 120, and any one of the relay devices (30a, 30b, 30c, 30d) may be called a relay device 30.

The transmission terminal 10 is configured to transmit and receive image data and voice data as examples of content data. In this embodiment, motion pictures (i.e., video data) are illustrated as an example of the image data. However, the image data may also be still pictures, or the image data may include both motion pictures and still pictures.

Note that, in the following, the transmission terminal may be simply called the "terminal" and the transmission management system may be simply called as the "management system".

As shown in FIG. 2, in the transmission system 1, a management data session "sei" for transmitting and receiving various kinds of management data is established between the terminals 10 via the management system 50, and sessions for transmitting and receiving image data and voice data are established between the terminals 10 via the relay device 30. In the embodiment shown in FIG. 2, the sessions for transmitting and receiving the image data and the voice data are collectively illustrated as a content data session "sed".

The terminal 10 shown in FIG. 1 transmits and receives content data including image data and voice data in order to communicate with another terminal 10. That is, the communications in this embodiment include not only the transmission and reception of voice data but also the transmission and reception of image data. However, the terminal 10 may be configured to transmit and receive the voice data solely without transmitting or receiving the image data. The relay device 30 is configured to relay the content data between the terminals 10. The management system 50 is configured to manage the terminals 10 and the relay device 30 in an integrated manner.

In the transmission system 1 shown in FIG. 1, routers (70a, 70b, 70c, 70d, 70ab, 70cd) are configured to select the optimal paths for the content data. Note that, in the following, any one of the routers (70a, 70b, 70c, 70d, 70ab, 70cd) may be simply called a router 70.

The program provision system 90 includes a hard disk (HD) configured to store programs for terminals, with which the terminal 10 may implement various functions or various processes. Therefore, the program provision system 90 may transmit the programs for terminals to the terminal 10. The HD of the program provision system 90 further stores programs for the relay device, with which the relay device 30 may implement various functions or various processes. Therefore, the program provision system 90 may transmit the programs for the relay device to the relay device 30. In addition, the HD of the program provision system 90 further stores programs for the management system, with which the management system 50 may implement various functions or various processes. Therefore, the program provision system 90 may transmit the programs for the management system to the management system 50.

The maintenance system 100 is a computer configured to maintain or manage at least one of the terminals 10, the relay device 30, the management system 50, and the program provision system 90. For example, if the maintenance system 100 is installed at a domestic location while the terminal 10, the relay device 30, the management system 50 and the program provision system 90 are installed at overseas locations, the maintenance system 100 remotely maintains or manages at least one of the terminal 10, the relay device 30, the management system 50, and the program provision system 90 via a communication network 2. In addition, the maintenance system 100 performs maintenance, such as the management of a model number, a serial number, a sale place, a maintenance inspection, a failure history, etc. on at least one of the terminal 10, the relay device 30, the management system 50, and the program provision systems 90 without using the communication network 2.

In the transmission system 1 shown in FIG. 1, the terminals (10*aa*, 10*ab*, . . . ), the relay device 30*a*, and the router 70*a* are connected via a LAN 2*a* so that they may communicate with one another. The terminals (10*ba*, 10*bb*, . . . ), the relay device 30*b*, and the router 70*b* are connected via a LAN 2*b* so that they may communicate with one another. The LAN 2*a* and the LAN 2*b* are set up in a predetermined company A. In the company A, the LAN 2*a* and the LAN 2*b* are connected via a dedicated communication line 2*ab* including the router 70*ab* so that they may communicate with one another. For example, the company A may be located in Japan, the LAN 2*a* may be set up in the Tokyo office, and the LAN 2*b* is set up in the Osaka office.

On the other hand, the terminals (10*ca*, 10*cb*, . . . ), the relay device 30*c*, and the router 70*c* are connected via a LAN 2*c* so that they may communicate with one another. The terminals (10*da*, 10*db*, . . . ), the relay device 30*d*, and the router 70*d* are connected via a LAN 2*d* so that they may communicate with one another. The LAN 2*c* and the LAN 2*d* are set up in a predetermined company B. In the company B, the LAN 2*c* and the LAN 2*d* are connected via a dedicated communication line 2*cd* including the router 70*cd* so that they may communicate with one another. For example, the company B may be located in the United States of America, the LAN 2*c* may be set up in the New York office, and the LAN 2*d* may be set up in the Washington, D.C. office. The company A and the company B are connected from the respective routers 70*ab* and 70*cd* via the Internet 2*i* so that the company A and the company B may communicate with each other via the Internet 2*i*.

Furthermore, the management system 50 and the program provision system 90 are connected to the terminal 10 and the relay device 30 via the Internet 2*i* so that they may communicate with one another. The management system 50 and the program provision system 90 may be installed in the company A or the company B, or may be installed in a region other than the companies A and B.

Note that in this embodiment, the communication network 2 is made up of the LAN 2*a*, the LAN 2*b*, the dedicated communication line 2*ab*, the Internet 2*i*, the dedicated communication line 2*cd*, the LAN 2*c*, and the LAN 2*d*. In the communication network 2, the communications are typically carried out via the wires, but may be partially carried out using the wireless communication protocols, such as Wi-Fi (Wireless Fidelity) or Bluetooth®.

In FIG. 1, the set of four numerals attached beneath or over each of the terminal 10, the relay device 30, the management system 50, the router 70, the program provision system 90, and the maintenance system 100 simply designates the IP address of the typical IPv4. For example, the IP address of the terminal 10*aa* is "1.2.1.3", as shown in FIG. 1. The IP address may be the IPv6; however, in this embodiment, the IPv4 is used for the sake of simplifying the illustration.

The terminal 10 may be used not only for communication between two or more offices or communication between different rooms in the same office, but may also be used for communication in the same room, communication between the outdoor locations, or communication between the indoor and outdoor locations. When the terminal 10 is used outdoors, the wireless communication may be conducted via a mobile communication network.

Hardware Configuration of Embodiment

Next, the hardware configuration of the embodiment will be described.

Figure 3:
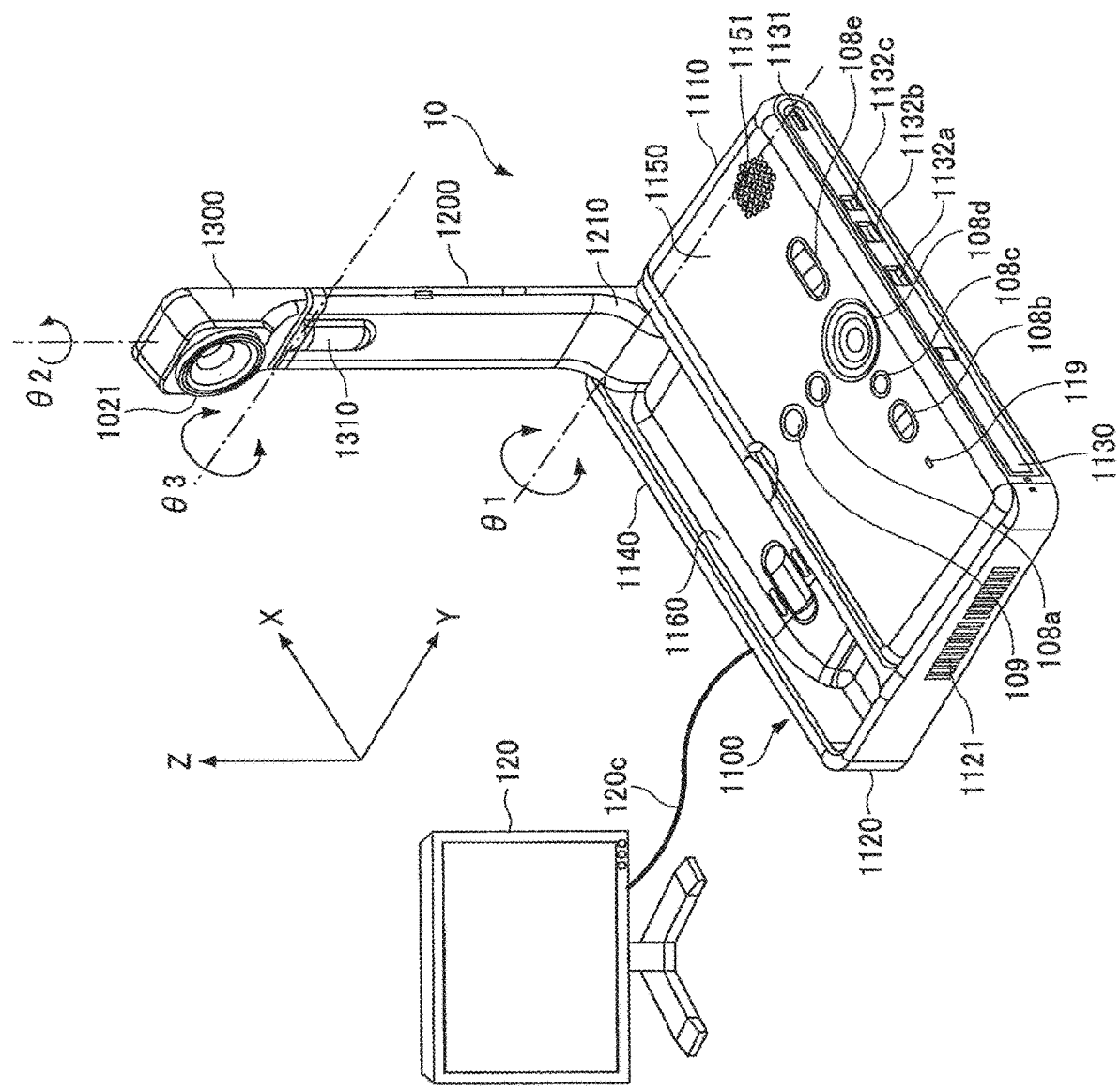
FIG. 3 is a perspective view of a transmission terminal according to the embodiment.
Figure 4:
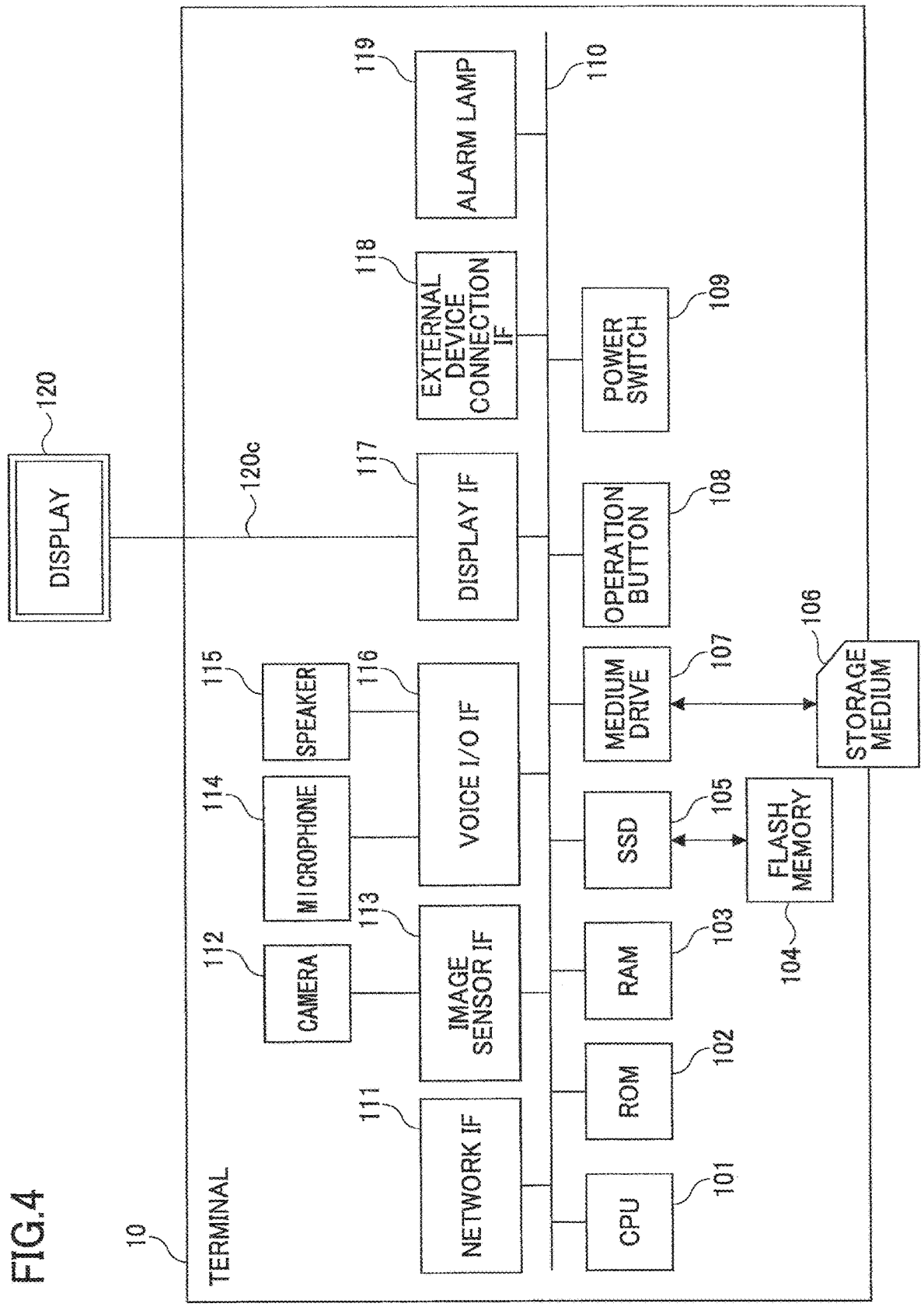
FIG. 4 is a block diagram showing the hardware configuration of the transmission terminal according to the embodiment.

First, the hardware configuration of the terminal 10 will be described with reference to FIGS. 3 and 4. FIG. 3 is a perspective view of the terminal 10 according to the embodiment. FIG. 4 is a block diagram showing the hardware configuration of the terminal 10 according to the embodiment.

Note that, in the following, an X-axis direction represents a longitudinal direction of the terminal 10, a Y-axis direction represents a direction perpendicular to the X-axis direction in a horizontal plane, and a Z-axis direction represents a direction perpendicular to the X-axis direction and the Y-axis direction (i.e., vertical direction).

As shown in FIG. 3, the terminal 10 includes a housing 1100, an arm 1200, and a camera housing 1300. A front wall face 1110 of the housing 1100 includes a not-illustrated air intake face which is formed with two or more air intake holes, and a rear wall face 1120 of the housing 1100 includes an exhaust face 1121 which is formed with two or more exhaust holes. Accordingly, by driving a cooling fan arranged in the housing 1100, the terminal 10 can take in external air behind the terminal 10 via the air intake face and exhaust the air inside the terminal 10 via the exhaust face 1121. A right-side wall face 1130 of the housing 1100 is formed with a voice-collecting hole 1131, via which a built-in microphone 114 (FIG. 4) can pick up audio sound, such as voice, sound, or noise.

The right-side wall face 1130 of the housing 1100 includes an operation panel 1150. This operation panel 1150 includes operation buttons (108*a*-108*e*), a power switch 109, an alarm lamp 119, and a voice output face 1151. The voice output face 1151 is formed with voice output holes for outputting voice from a built-in speaker 115 (FIG. 4). Further, a left-side wall face 1140 of the housing 1100 includes an accommodation unit 1160 which is a recessed seating unit for accommodating the arm 1200 and the camera housing 1300. The right-side wall face 1130 of the housing 1100 further includes connection ports (1132*a*-1132*c*) for electrically connecting a cable to an external device connection interface (IF) 118. On the other hand, the left-side wall face 1140 of the housing 1100 includes a not-illustrated connection port for electrically connecting a cable 120*c* of the display 120 to the external device connection interface (IF) 118.

Note that, in the following, any one of the operation buttons (108*a*-108*e*) may be called an operation button 108, and any one of the connection ports (1132a-1132c) may be called a connection port 1132.

Next, the arm 1200 is attached to the housing 1100 via a torque hinge 1210 such that the arm 1200 is movable in upward and downward directions within a range of tilt angle θ1 of 135 degrees with respect to the housing 1100. The arm 1200 shown in FIG. 3 is in a state where the tilt angle θ1 is 90 degrees.

The camera housing 1300 includes a built-in camera 1021, and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotationally attached to the arm 1200 in upward and downward directions via the torque hinge 1310 such that the camera housing 1300 is movable in the up, down, right and left directions in a range of pan angle θ2 of ±180 degrees and in a range of tilt angle θ3 of ±45 degrees when the pan angle and the tilt angle in the state shown in FIG. 3 are 0 degrees.

As shown in FIG. 4, the terminal 10 includes a central processing unit (CPU) 101 configured to control overall operations of the terminal 10, a read-only memory (ROM) 102 storing programs for the terminal, a random access memory (RAM) 103 used as a work area of the CPU 101, a flash memory 104 configured to store various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, the operation button 108 operated by a user for selecting an address of the terminal 10, the power switch 109 for switching ON/OFF of the power of the terminal 10, and a network interface (IF) 111 for transmitting data utilizing the communication network 2.

The terminal 10 further includes a built-in camera 112 configured to image a subject based on the control of the CPU 101, an image sensor interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, the external device connection interface (IF) 118 configured to connect various external devices to the connection ports (1132a to 1132c) shown in FIG. 3, the alarm lamp 119 configured to inform the user of various functional problems of the terminal 10, and a bus line 110 such as an address bus or a data bus for electrically connecting the elements and devices with one another as shown in FIG. 4 via the bus line 110.

The display 120 is a display unit formed of liquid crystal or an organic EL material configured to display images of the subject or icons for operating the terminal 10. Further, the display 120 is connected to the display IF 117 via the cable 120c (see FIG. 3). The cable 120c may be an analog RGB (VGA) cable, a component video cable, a high-definition multimedia interface (HDMI) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connection IF 118 may be connected via a universal serial bus (USB) cable with external devices, such as the external camera, the external microphone, and the external speaker. The USB cable is inserted in the connection port 1132 of the housing 1100 shown in FIG. 3. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the storage medium 106 is removable from the terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The above-described programs for the terminal may be recorded in an installable format or in an executable format on a computer-readable recording medium such as the storage medium 106 to distribute the medium. The above-described programs for the terminal may be recorded in the ROM 102 rather than the flash memory 104. The external appearance and the hardware configuration of the terminal shown in FIGS. 3 and 4 are to show typical examples and not limited to these examples. For example, the appearance and hardware of the terminal may be a desktop or notebook personal computer. In this case, the built-in camera and the built-in microphone are not necessarily needed, and the external camera and the external microphone may be used.

Figure 5:
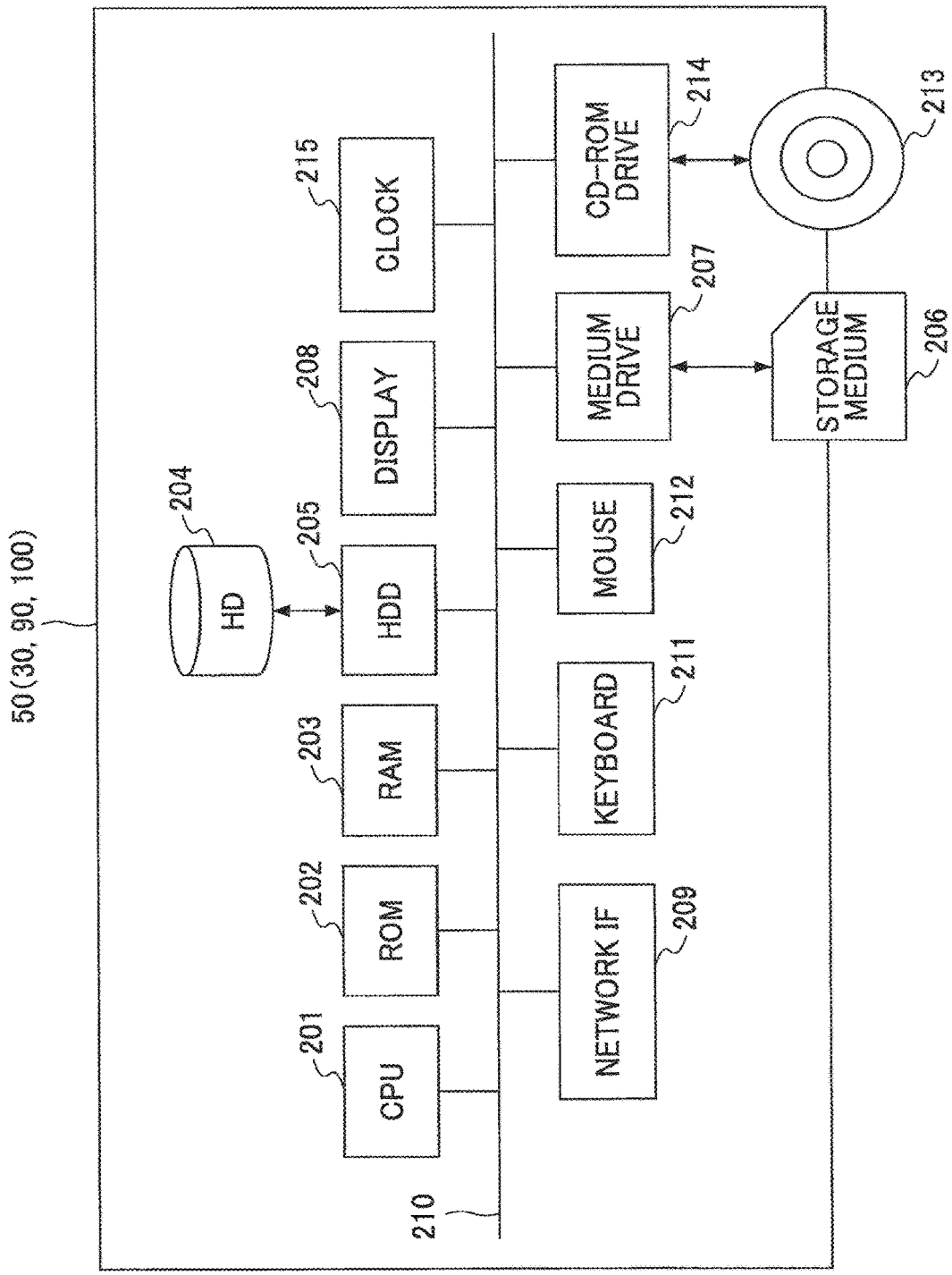
FIG. 5 is a block diagram showing the hardware configuration of a transmission management system according to the embodiment.

Next, the hardware configuration of the management system 50, the relay device 30, the program provision system 90, and the maintenance system 100 will be described with reference to FIG. 5. FIG. 5 is a diagram showing the hardware configuration of the management system 50 according to the embodiment. Because the relay device 30, the management system 50, the program provision system 90, and the maintenance system 100 have the external appearance which is the same as the external appearance of a server computer, a description of the external appearance thereof will be omitted.

As shown in FIG. 5, the management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 208 configured to display various information such as a cursor, menus, windows, characters and images, a network interface (IF) 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, a clock 215 configured to output date/time data, and a bus line 210 such as an address bus or a data bus for electrically connecting the elements and devices with one another shown in FIG. 5 via the bus line 210.

Note that the above-described programs for the management system may be in an installable format or in an executable format on a computer-readable recording medium such as the storage medium 206 or the CD-ROM 213 to distribute the medium. The above-described programs for the management system may be recorded in the ROM 202 rather than the HD 204.

Further, the relay device 30 has a hardware configuration similar to that of the management system 50, and a description of the hardware configuration of the relay device 30 will be omitted. Note that the HD 204 may store programs for controlling the relay device 30. In this case, the programs for the relay device may also be recorded in an installable format or in an executable format on a computer-readable recording medium such as the storage medium 206 or the CD-ROM 213 to distribute the medium. The above-described programs for the relay device may be recorded in the ROM 202 rather than the HD 204.

Further, the program providing system 90 and the maintenance system 100 have a hardware configuration similar to that of the management system 50, and a description of the hardware configuration of the program providing system 90 and the maintenance system 100 will be omitted. Note that the HD 204 may store programs for controlling the program providing system 90 or the maintenance system 100. In this case, the programs for the program providing system 90 or the maintenance system 100 may also be recorded in an installable format or in an executable format on a computer-readable recording medium such as the storage medium 206 or the CD-ROM 213 to distribute the medium. The above-described programs for the program providing system 90 or the maintenance system 100 may be recorded in the ROM 202 rather than the HD 204.

Note that other examples of the removable recording medium include a compact disc recordable (CD-R), a digital versatile disk (DVD), and a Blu-ray Disc (BD).

Functional Configuration of Embodiment

Figure 6:
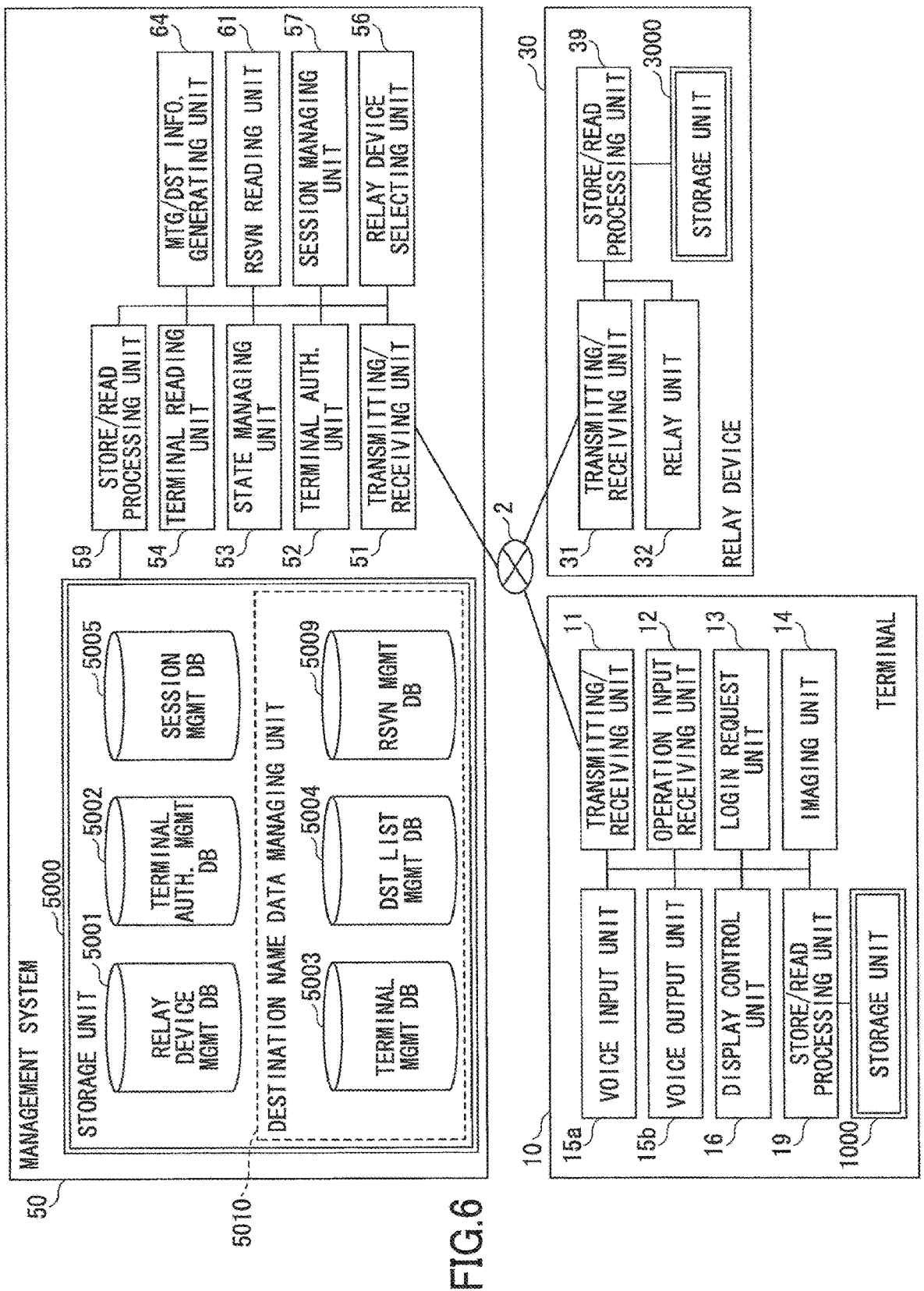
FIG. 6 is a block diagram showing the functional configuration of the transmission terminal, the relay device, and the transmission management system which constitute the transmission system according to the embodiment.

Next, the functional configuration of the embodiment will be explained with reference to FIG. 6. FIG. 6 is a block diagram showing the functional configuration of the terminal, the relay device, and the management system which constitutes the transmission system according to the embodiment. As shown in FIG. 6, the terminal 10, the relay device 30, and the management system 50 are connected via the communication network 2 so that these devices can communicate with one another. Note that the program provision system 90 and the maintenance system 100 as shown in FIG. 1 are not directly associated with videoconferencing communications, and therefore the illustrations thereof are omitted from FIG. 6.

As shown in FIG. 6, the terminal 10 includes a transmitting/receiving unit 11, an operation input receiving unit 12, a login request unit 13, an imaging unit 14, a voice input unit 15a, a voice output unit 15b, a display control unit 16, and a store/read processing unit 19. These units of the terminal 10 represent functions and units implemented by any of the elements and devices shown in FIG. 4, which are activated by instructions from the CPU 101 based on the programs read into the RAM 103 from the flash memory 104 or the ROM 102. Further, the terminal 10 further includes a storage unit 1000 which is formed of the RAM 103 shown in FIG. 4 and the flash memory 104 or the ROM 102 shown in FIG. 4.

Functional Units of Terminal

Next, the functional configuration of the terminal 10 will be described with reference to FIGS. 4 and 6. The transmitting/receiving unit 11 is configured to transmit various data (information) to and receive such data from other terminals, relay devices, and systems via the communication network 2. The function of the transmitting/receiving unit 11 may be implemented by the network interface (IF) 111 shown in FIG. 4 and by instructions received from the CPU 101 shown in FIG. 4. The transmitting/receiving unit 11 is an example of a receiving unit configured to receive destination name data transmitted by the management system 50.

The operation input receiving unit 12 is configured to receive various inputs from the user, and such a function of the operation input receiving unit 12 is implemented by the operation button 108 and the power switch 109 shown in FIG. 4 and the instructions from the CPU 101 shown FIG. 4. For example, when the user switches ON the power switch 109 shown in FIG. 4, the operation input receiving unit 12 shown in FIG. 6 receives a power-ON signal to turn ON the power supply of the terminal 10.

The login request unit 13 is configured to automatically transmit a login request message indicating that the user desires to login, and a current IP address of the terminal 10 as an IP address of a request source terminal from the transmitting/receiving unit 11 to the management system 50 via the communication network 2 when the power-ON signal is received by the operation input receiving unit 12 as a trigger. Such a function of the login request unit 13 is implemented by instructions received from the CPU 101 shown in FIG. 4. On the other hand, when the user switches OFF the power switch 109, the transmitting/receiving unit 11 transmits power-OFF state information to the management system 50, and subsequently the operation input receiving unit 12 turns OFF the power supply completely. Accordingly, the management system 50 may detect that the power of the terminal 10 is changed from the power-ON state to the power-OFF state.

The imaging unit 14 is configured to take an image of a subject and output image data of the subject, and such a function of the imaging unit 14 is implemented by instructions received from the CPU 101 shown in FIG. 4 and by the camera 112 and the image sensor IF 113 shown in FIG. 4.

The voice input unit 15a is configured to input voice data of the voice signal obtained by the microphone 114 that converts voice of the user into the voice signal, and such a function of the voice input unit 15a is implemented by instructions received from the CPU 101 shown in FIG. 4 and by the voice input/output IF 116 shown in FIG. 4.

The voice output unit 15b is configured to output a voice signal corresponding to the voice data to the speaker 115 and cause the speaker 115 to produce sound or voice according to the voice signal, and such a function of the voice output unit 15b is implemented by instructions received from the CPU 101 shown in FIG. 4 and by the voice input/output IF 116 shown in FIG. 4.

The display control unit 16 is configured to control transmission of the image data to the display 120, and such a function of the display control unit 16 is implemented by instructions received from the CPU 101 shown in FIG. 4 and by the display IF 117 shown in FIG. 4. The display control unit 16 is an example of an outputting unit configured to output the destination name data to the display 120 by transmitting the destination name data received by the transmitting/receiving unit 11 to the display 120.

The store/read processing unit 19 is configured to store various data in the storage unit 1000 or read various data from the storage unit 1000, and such a function of the store/read processing unit 19 is implemented by the SSD 105 shown in FIG. 4 and by instructions received from the CPU 101 shown in FIG. 4. The storage unit 1000 stores a terminal ID (identification), a password, etc. for identifying the terminal 10. The store/read processing unit 19 is configured to store and overwrite image data and voice data in the storage unit 1000 every time the terminal 10 receives the image data and the voice data from the destination terminal during the communication between the terminal 10 and the destination terminal. Note that the display 120 displays previous image data before being overwritten with new image data and the speaker 115 outputs previous voice data before being overwritten with new voice data.

Note that the terminal ID and the later-described relay device ID individually indicate identification information formed of language, characters and various kinds of symbols that uniquely identify the terminal 10 and the relay device 30, respectively. The terminal ID and the relay device ID may be the identification information formed of a combination of two or more of the languages, characters, and various kinds of symbols.

Functional Configuration of Relay Device

As shown in FIG. 6, the relay device 30 includes a transmitting/receiving unit 31, a relay unit 32, and a store/read processing unit 39. These units of the relay device 30 represent functions and units implemented by any of the elements and devices shown in FIG. 5, which are activated by instructions from the CPU 201 based on the programs for the relay device read into the RAM 103 from the HD 204 shown in FIG. 5. The relay device 30 further includes a storage unit 3000 which is formed of the RAM 203 shown in FIG. 5 or the HD 204 shown in FIG. 5.

Next, the functional configuration of the relay device 30 will be described. Note that, in the following, the functions of the relay device 30 are explained in association with the main elements and devices for implementing the units of the relay device 30 shown in FIG. 5.

The transmitting/receiving unit 31 of the relay device 30 shown in FIG. 6 is configured to transmit various data (information) to and receive such data from other terminals, relay devices and systems via the communication network 2, and such a function of the transmitting/receiving unit 31 may be implemented by instructions from the CPU 201 shown in FIG. 5 and by the network interface (IF) 209 shown in FIG. 5.

The relay unit 32 is configured to relay the content data exchanged between the terminals 10 in the content data session sed through the transmitting/receiving unit 31, and such a function of the relay unit 32 may be implemented by instructions received from the CPU 201 shown in FIG. 5.

The store/read processing unit 39 is configured to store various data in the storage unit 3000 and read the stored data from the storage unit 3000, and such a function of the store/read processing unit 39 may be implemented by instructions received from the CPU 201 shown in FIG. 5 and by the HDD 205 and the clock 215 shown in FIG. 5.

Functional Configuration of Management System

As shown in FIG. 6, the management system 50 includes a transmitting/receiving unit 51, a terminal authentication unit 52, a state managing unit 53, a terminal reading unit 54, a relay device selecting unit 56, a session managing unit 57, a store/read processing unit 59, a reservation reading unit 61, and a meeting/destination information generating unit 64. These units of the management system 50 represent functions and units implemented by any of the elements and devices shown in FIG. 5, which are activated by instructions received from the CPU 201 based on the programs for the management system read into the RAM 203 from the HD 204. The management system 50 further includes a storage unit 5000 which is formed of the HD 204 shown in FIG. 5.

Relay Device Management Table

The storage unit 5000 includes a relay device management database (MGMT DB) 5001 which is formed on a relay device management table as shown in FIG. 7. FIG. 7 is a conceptual diagram showing the relay device management table. In this relay device management table, the relay device IDs of the relay devices 30 are respectively associated with the IP addresses of the relay devices 30. For example, in the relay device management table shown in FIG. 7, the relay device ID "111a" of the relay device 30a is associated with the IP address "1.2.1.2".

Terminal Authentication Management Table

The storage unit 5000 includes a terminal authentication management database (MGMT DB) 5002 which is formed of a terminal authentication management table as shown in FIG. 8. FIG. 8 is a conceptual diagram showing the terminal authentication management table. In this terminal authentication management table, passwords are respectively associated with the terminal IDs of all the terminals 10 managed by the management system 50. For example, in the terminal authentication management table shown in FIG. 8, the terminal ID "01aa" of the terminal 10aa is associated with the password "aaaa".

Session Management Table

The storage unit 5000 includes a session management database (MGMT DB) 5005 which is formed of a session management table as shown in FIG. 9. FIG. 9 is a conceptual diagram showing the session management table. In this session management table, session IDs which identify content data sessions "sed" in which the content data are exchanged between the terminals 10 are associated with reservation IDs which identify reservations for the communication to which the corresponding session is related, relay device IDs which identify the relay devices 30 used for relaying the content data in the corresponding session, and terminal IDs which identify the terminals 10 conducting the communication in the corresponding session. For example, in the session management table shown in FIG. 9, the session ID "se03" is associated with the reservation ID "rsv08" and it is shown that the relay device 30c with the relay device ID "111c" relays the content data between the terminals "10ae" and "10dc" in the corresponding session. When the communication which is not related to the reservation is conducted, the item of reservation ID of the session management table remains blank.

Destination List Management Table

The storage unit 5000 includes a destination list management database (MGMT DB) 5004 which is formed of a destination list management table as shown in FIG. 10. FIG. 10 is a conceptual diagram showing the destination list management table. In this destination list management table, terminal IDs (an example of request source identification data) of the terminals 10 as request source terminals are associated with terminal IDs of the destination candidate terminals with which the request source terminals 10 can communicate, and destination name data (first destination name data) which indicate names of the destination candidate terminals. For example, in the destination list management table shown in FIG. 10, it is observed that the destination candidate terminals with which the terminal 10aa having the terminal ID "01aa" as the request source terminal can communicate are the terminals (10ab, 10ba, . . . , 10db). Further, in the destination list management table, two or more destination name data items (i.e., "Osaka YY planning team", "Osaka BO, A Inc.", etc.) are managed with respect to a single destination (i.e., the destination terminal 10ba with the destination terminal ID "01ba"). The destination name data is registered in response to receiving a request of registration of the destination name data in which a destination terminal with which the request source terminal 10 can communicate is designated. Note that, in this embodiment, appropriate names that are frequently used on the request source side are used as the first destination name data (for example, in a case of destination terminals in their own company, the names such as team names are used, and in a case of destination terminals in other companies, names such as company names are used) such that the request source terminal can easily identify the destination terminal. The destination list management database 5004 in which the first destination name data is managed constitutes part of a destination name data managing unit 5010 shown in FIG. 6.

Reservation Management Table

The storage unit 5000 includes a reservation management database (RSVN MGMT DB) 5009 which is formed of a reservation management table as shown in FIG. 11A and a reservation terminal management table as shown in FIG. 11B. FIG. 11A is a conceptual diagram showing the reservation management table, and FIG. 11B is a conceptual diagram showing the reservation terminal management table. In the reservation management table, when the meeting communication between the terminals 10 is reserved, the reservation ID which identifies the reservation is associated with the start date/time of the meeting, the end date/time of the meeting, and the meeting name. For example, in the reservation management table shown in FIG. 11A, the reservation ID "rsv03" which identifies the reservation of a meeting is associated with the start date/time "15:00 on Nov. 10, 2011", the end date/time "17:00 on Nov. 10, 2011", and the meeting name "security meeting".

On the other hand, in the reservation terminal management table, the above-described reservation ID is associated with the terminal ID of the terminal 10 which conducts the reserved meeting communication, and the destination name data (second destination name data) which indicates the name of the destination when the terminal 10 is selected as the destination terminal. When two or more reservations are assigned to a single terminal 10, two or more destination name data items (i.e., "Tokyo KK sales project team", "Tokyo", etc.) may be associated with the single terminal 10 (i.e., the terminal 10aa with the terminal ID "01aa"). Note that, in this embodiment, an appropriate name is used as the second destination name data so that each participant at the meeting can easily identify other participants. The reservation terminal management table of the reservation management database (DB) 5009 in which the second destination name data is managed constitutes part of the destination name data managing unit 5010 shown in FIG. 6.

An additional table record containing the reservation ID, the start date/time, the end date/time, the meeting name, the terminal ID, and the destination name data may be registered in the reservation management table and the reservation terminal management table by the store/read processing unit 59 of the management system 50 in response to receiving a record registration request from any one of the terminals 10.

Terminal Management Table

The storage unit 5000 includes a terminal management database (MGMT DB) 5003 which is formed of a terminal management table as shown in FIG. 12. FIG. 12 is a conceptual diagram showing the terminal management table. In this terminal management table, the terminal IDs of the terminals 10 are associated with the operating states of the terminals 10, the IP addresses of the terminals 10, and the destination name data items (third destination name data) which indicate the names of the destinations when the corresponding terminal 10 is selected as the destination. For example, in the terminal management table shown in FIG. 12, the terminal ID "01aa" of the terminal 10aa is associated with the operating state "online", the IP address "1.2.1.3" of the terminal 10aa, and the destination name data "03-1234-OOOO" of the terminal 10aa.

Note that, in this embodiment, a numeric value such as a telephone number is used as the third destination name data such that the destination name data may be notified to all the other terminals 10 with which the source terminal can communicate. The terminal management database 5003 in which the third destination name data is managed constitutes part of the destination name data managing unit 5010 shown in FIG. 6.

Functional Configuration of Management System

Next, the functional configuration of the management system 50 will be described. Note that, in the following, the functions of the management system 50 are explained in association with the main elements and devices for implementing the units of the management system 50 shown in FIG. 5.

The transmitting/receiving unit 51 of the management system 50 is configured to transmit various data (information) to and receive such data from other terminals, relay devices and systems via the communication network 2, and such a function of the transmitting/receiving unit 51 may be implemented by instructions received from the CPU 201 shown in FIG. 5 and by the network IF 209 shown in FIG. 5. The transmitting/receiving unit 51 is an example of a destination name data transmitting unit configured to perform a process for transmitting destination name data which transmits destination name data to the terminal 10.

The terminal authentication unit 52 is configured to search for the terminal authentication management table (FIG. 8) of the storage unit 5000 with the terminal ID and the password contained in the login request message received by the transmitting/receiving unit 51 used as search keys, and authenticate the corresponding terminal based on whether the terminal ID and the password contained in the login request message are identical to those managed in the terminal authentication management table. The function of the terminal authentication unit 52 may be implemented by instructions received from the CPU 201 shown in FIG. 5.

The state managing unit 53 is configured to manage the terminal management table (FIG. 12) by associating the terminal ID, the operating state, and the IP address of the request source terminal which has sent the login request, in order to manage the operating state of the request source terminal. The function of the state managing unit 53 may be implemented by instructions received from the CPU 201 shown in FIG. 5. Further, the state managing unit 53 is configured to receive the power-OFF state information sent from the terminal 10 when the user switches OFF the power switch 109 of the terminal 10, and changes the operating state of the terminal management table from the online state to the off-line state based on the received power-OFF state information.

The terminal reading unit 54 is configured to search for the terminal ID of the destination candidate terminal 10 in the destination list management table (FIG. 10) by the terminal ID of the source terminal having sent the login request used as search keys, and obtain the terminal ID of the destination candidate terminal 10. The function of the terminal reading unit 54 may be implemented by instructions received from the CPU 201 shown in FIG. 5. Further, the terminal reading unit 54 is an example of a destination name data reading unit configured to perform a destination name data reading process which obtains at least one destination name data item from the plural destination name data items managed in the destination name data managing unit 5010 formed of the terminal management database 5003, the destination list management database 5004, and the reservation management database 5009.

The relay device selecting unit 56 is configured to select the relay device 30 used for relaying the content data between the terminals 10 in the communication in the content data session sed. The function of the relay device selecting unit 56 may be implemented by instructions from the CPU 201 shown in FIG. 5.

The session managing unit 57 is configured to generate a session ID which identifies a content data session sed every time the content data session sed between the terminals 10 is newly established. The function of the session managing unit 57 may be implemented by instructions received from the CPU 201 shown in FIG. 5. Further, the session managing unit 57 is configured to associate the session ID, the reservation ID, the terminal ID, and the relay device ID, and store and manage them in the session management table (FIG. 9).

The store/read processing unit 59 is configured to perform a process which stores various data in the storage unit 5000 and reads the stored data from the storage unit 5000. The function of the store/read processing unit 59 may be implemented by instructions received from the CPU 201 shown in FIG. 5 and by the HDD 205 and the clock 215 shown in FIG. 5.

The reservation reading unit 61 is configured to search for the reservation terminal management table (FIG. 11) by the reservation ID used as a search key, and obtain the corresponding terminal ID. The function of the reservation reading unit 61 may be implemented by instructions received from the CPU 201 shown in FIG. 5. Further, the reservation reading unit 61 is configured to search for the reservation management table by the reservation ID used as a search key and obtain the corresponding meeting name, the start date/time, and the end date/time.

The meeting/destination information generating unit 64 is configured to generate, with respect to each reservation ID, meeting information which contains the meeting name, the start date/time, and the end date/time, and destination information which contains the terminal ID, the operating state, and the destination name data. The function of the meeting/destination information generating unit 64 may be implemented by instructions received from the CPU 201 shown in FIG. 5. Further, the meeting/destination information generating unit 64 is configured to generate meeting detailed information which contains the reservation ID, the meeting name, the start date/time, the end date/time, the terminal ID, the operating state and the destination name data.

Processes and Operation

Figure 13:
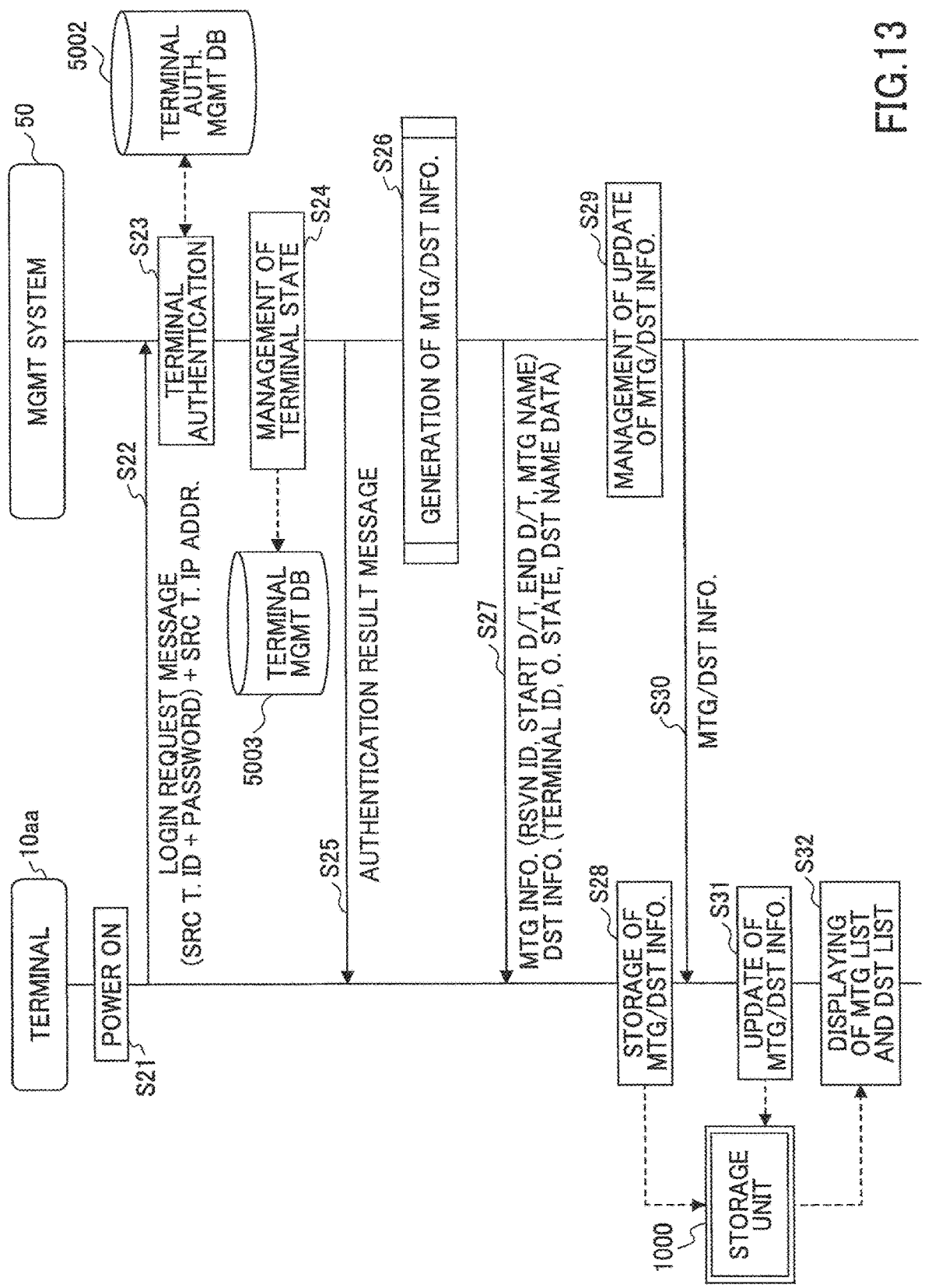
FIG. 13 is a sequence diagram for explaining a preparatory process for starting communication between transmission terminals.
Figure 14:
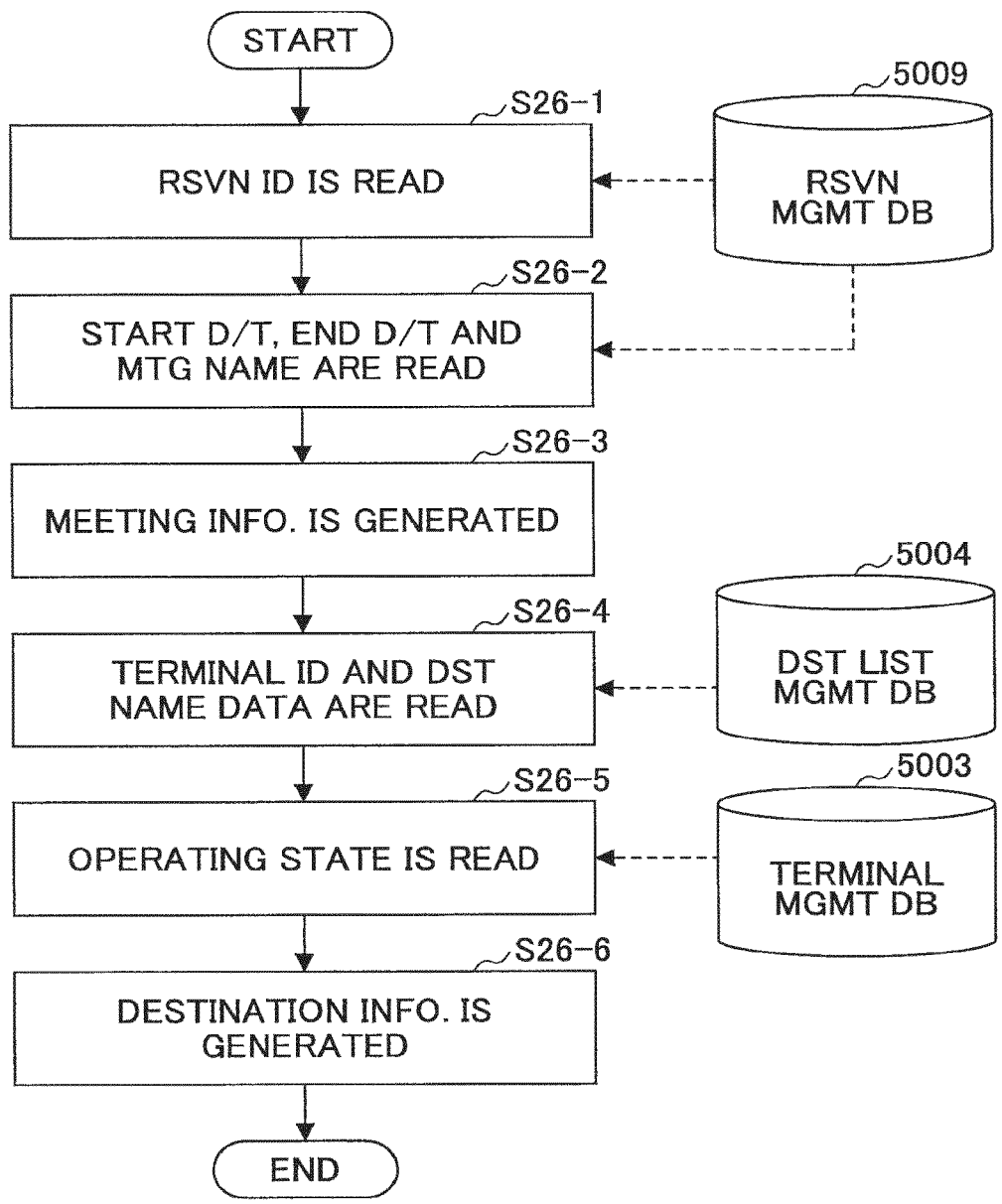
FIG. 14 is a flowchart for explaining a process for generating meeting information and destination information.
Figure 16:
FIG. 16 is a conceptual diagram showing an example of a meeting list and a destination list.

Next, the processes carried out by the transmission system 1 according to the embodiment will be described. First, a process for transmitting and receiving the management data in a preparatory step before the terminal 10aa starts communication will be described with reference to FIGS. 13 to 16. FIG. 13 is a sequence diagram for explaining a preparatory process for starting communication between terminals. FIG. 14 is a flowchart for explaining a process for generating the meeting information and the destination information. FIG. 15A is a conceptual diagram showing an example of the meeting information and FIG. 15B is a conceptual diagram showing an example of the destination information. FIG. 16 is a conceptual diagram showing an example of a meeting list and a destination list. In the process of FIG. 13, various management data is transmitted and received in the management data session "sei" shown in FIG. 2.

In the process of FIG. 13, if the user of the terminal 10aa switches ON the power switch 109 shown in FIG. 4, the operation input receiving unit 12 shown in FIG. 6 receives a power-ON signal from the power switch 109 and turns ON the power supply of the terminal 10aa (step S21). In response to the power-ON signal, the login request unit 13 transmits automatically a login request message indicating the user's login request from the transmitting/receiving unit 11 to the management system 50 via the communication network 2 (step S22). This login request message contains the terminal ID and the password which identify the terminal 10aa as the request source terminal. The terminal ID and the password are read from the storage unit 1000 through the store/read processing unit 19 and sent to the transmitting/receiving unit 11. Note that when the terminal 10aa transmits the login request message to the management system 50, the management system 50 as the receiver station may detect the IP address of the terminal 10aa as the transmitter station.

Subsequently, the terminal authentication unit 52 of the management system 50 searches for the terminal authentication management table (FIG. 8) of the terminal authentication management database 5002 of the storage unit 5000 by using the terminal ID and the password contained in the login request message received at the transmitting/receiving unit 51 as search keys, and authenticates the terminal 10aa based on whether the terminal ID and password contained in the login request message are identical to those managed in the terminal authentication management table (step S23). The terminal ID and the password which are identical to those contained in the login request message are managed by the terminal authentication unit 52, and when the terminal authentication unit 52 determines that the terminal 10 from which the login request message has been received has the authorized access right, the state managing unit 53 associates the terminal ID of the terminal 10aa with the operating state and the IP address of the terminal 10aa contained in the login request message and stores the same in the terminal management database (DB) 5003 (FIG. 12) (step S24). Accordingly, the terminal ID "01aa" associated with the operating state "online" and the IP address "1.2.1.3" of the terminal 10aa are stored in the terminal management table as shown in FIG. 12.

Subsequently, the transmitting/receiving unit 51 of the management system 50 transmits the authentication result information, indicating the authentication result obtained from the terminal authentication unit 52, through the communication network 2 to the terminal 10aa from which the above login request message has been received (step S25). Note that, in this embodiment, the management system 50 continuously performs the following process (FIG. 14) in the case where the terminal authentication unit 52 determines that the terminal has the authorized access right.

The meeting/destination information generating unit 64 of the management system 50 generates meeting information that indicates a meeting which contains as a participant the terminal 10aa from which the login request message has been received, and destination information that indicates a candidate for the destination of the terminal 10aa (step S26). This process for generating the meeting information and the destination information will be described with reference to FIG. 14.

FIG. 14 is a flowchart for explaining the process for generating the meeting information and the destination information. In the process of FIG. 14, the reservation reading unit 61 of the management system 50 first searches for the reservation terminal management table (FIG. 11B) by using the terminal ID "01aa" of the terminal 10aa from which the login request message has been received as a search key, and reads the corresponding reservation IDs ("rsv01", "rsv02") from the reservation terminal management table (step S26-1). Hence, the reservation IDs which identify the reservation of the meeting in which the terminal 10aa is scheduled to participate are read and obtained.

Further, the reservation reading unit 61 searches for the reservation management table (FIG. 11A) by using the read reservation IDs ("rsv01", "rsv02") as search keys, and reads a start date/time, an end date/time, and a meeting name of the meeting indicated by each reservation ID from the reservation management table (step S26-2). The meeting/destination information generating unit 64 generates the meeting information that indicates the start date/time, the end date/time, and the meeting name for each of the reservation IDs read by the reservation reading unit 61 (step S26-3). An example of the generated meeting information is shown in FIG. 15A.

Subsequently, the terminal reading unit 54 of the management system 50 searches for the destination list management table (FIG. 10) by using the terminal ID "01aa" of the terminal 10aa from which the login request message has been received as a search key, and reads the destination name data that indicates the terminal ID of the destination candidate terminal 10 with which the terminal 10aa can communicate, and the destination candidate terminal name (step S26-4). For example, at this time, a terminal ID ("01ab", . . . ) and a destination name data ("XX sales project team", . . . ) of the destination candidate terminal (10ab, . . . ) corresponding to the terminal ID "01aa" of the terminal 10aa may be read and obtained.

Subsequently, the terminal reading unit 54 searches for the terminal management table (FIG. 12) by using the read terminal ID ("01ab", . . . ) of the destination candidate terminal 10 as a search key, and reads an operating state ("during meeting", . . . ) (step S26-5). Accordingly, the meeting/destination information generating unit 64 generates the destination information that contains the terminal ID, the destination name data, and the operating state of the destination candidate terminal 10 (step S26-6). An example of the generated destination information is shown in FIG. 15B.

Subsequently, as shown in FIG. 13, the transmitting/receiving unit 51 of the management system 50 transmits the meeting information and the destination information generated by the meeting/destination information generating unit 64 to the terminal 10aa (step S27). In the terminal 10aa, the transmitting/receiving unit 11 receives the meeting information and the destination information, and the store/read processing unit 19 stores the meeting information and the destination information in the storage unit 1000 (step S28).

When predetermined timing is reached, the management system 50 repeatedly performs the processing of the step S26, and manages updates of the meeting information and the destination information (step S29). When one of the meeting information and the destination information is updated, the transmitting/receiving unit 51 transmits the meeting information (the reservation ID, the start date/time, the end date/time, and the meeting name) and the destination information (the terminal ID, the operating state, and the destination name data) to the terminal 10aa (step S30). The store/read processing unit 19 of the terminal 10aa sequentially performs updates by storing the meeting information and the destination information received from the management system 50 into the storage unit 1000 (step S31).

The display control unit 16 of the terminal 10aa displays a meeting list and a destination list on display 120aa based on the meeting information and destination information stored in the storage unit 1000 (step S32). An example of the meeting list and the destination list displayed is shown in FIG. 16.

As shown in FIG. 16, in a meeting and destination list box 311-1, the meeting list and the destination list are displayed. The destination list includes a plurality of destination name data items 311-2, such as "XX sales project team", and a plurality of icons (311-3a, 311-3b, 311-3c) which indicate the operating states of the destination candidate terminals 10 of the destination name data items. For example, the icon 311-3a as one of the plurality of icons indicates that this terminal 10 is one of the destination candidate terminals which is in an on-line state, ready for operation, and capable of communicating with the terminal 10aa. The icon 311-3b indicates that this terminal 10 is one of the destination candidate terminals which is in an off-line state and not capable of communicating with the terminal 10aa. The icon 311-3c indicates that this terminal 10 is one of the destination candidate terminals which is conducting the videoconference.

Further, in the meeting and destination list box 311-1, the meeting list includes a plurality of meeting data items 311-4, such as "2011/11/10 10:00-11:30 Sales Meeting", and a plurality of icons 311-4a for requesting the meeting detailed information for each meeting name. Each of the meeting data items 311-4 includes the start date/time, the end date/time, and the meeting name of the corresponding meeting.

Figure 17:
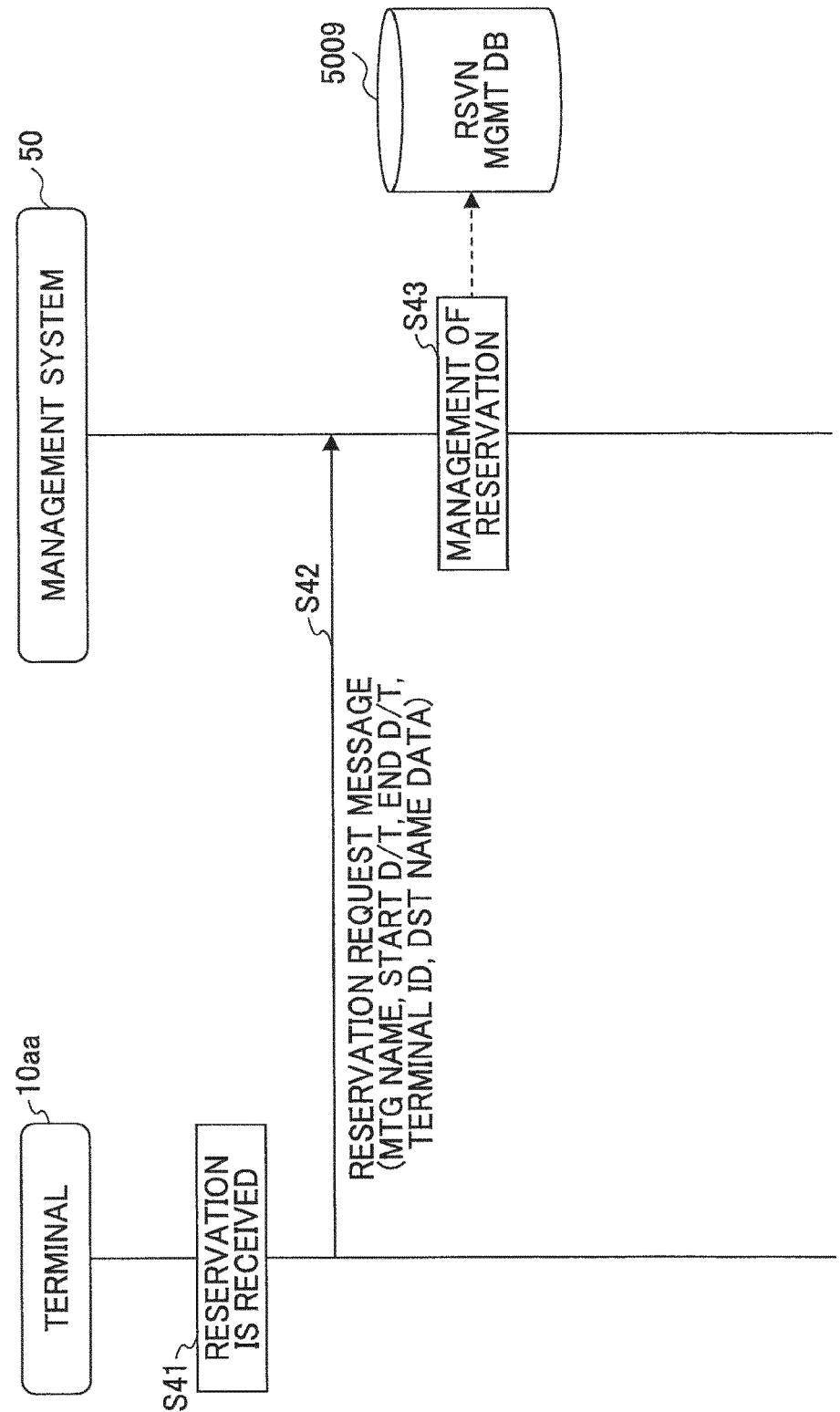
FIG. 17 is a sequence diagram for explaining a process for receiving a reservation.
Figure 18:
FIG. 18 is a conceptual diagram showing an example of a reservation acceptance screen.

Next, the process for receiving the reservation of the meeting communication between the terminals 10 will be described with reference to FIGS. 17 and 18. FIG. 17 is a sequence diagram for explaining the process for receiving the reservation. FIG. 18 is a conceptual diagram showing an example of a reservation acceptance screen. Note that in the process of FIG. 17, various management data is transmitted and received in the management data session "sei" shown in FIG. 2.

After the destination information from the management system 50 is received at the terminal 10aa in step S27 in FIG. 13, in the process of FIG. 17, the operation input receiving part 12 of the terminal 10aa receives the reservation of the meeting communication between the terminals (step S41). In this case, the display control unit 16 of the terminal 10aa displays on a display 120aa the reservation acceptance screen shown in FIG. 18. The operation input receiving unit 12 receives the meeting name, the start date/time, the end date/time, and the terminal 10 scheduled to participate in the meeting, which are input from the user. In this embodiment, the terminal 10 scheduled to participate in the meeting may be selected from among the terminals 10 identified by the terminal IDs contained in the destination information received from the management system 50. The destination name data items contained in the destination information are initially set as the names of the terminals 10 scheduled to participate in the meeting. Such initial terminal name is updated by selecting the corresponding one of the icons 320 present in the reservation acceptance screen and editing the same. After these data items are received by the operation input receiving unit 12, the transmitting/receiving unit 11 of the terminal 10aa transmits to the management system 50 a reservation request message which indicates the reservation request and contains the meeting name, the start date/time, the end date/time, the terminal ID of the terminal 10 scheduled to participate in the meeting, and the updated destination name data (step S42).

After the reservation request message is received by the transmitting/receiving unit 51 of the management system 50, the store/read processing unit 59 associates the reservation ID with the meeting name, the start date/time, and the end date/time contained in the reservation request message, and stores the same in the reservation management table (FIG. 11A) (step S43). Note that the above reservation ID may be generated by the management system 50, or may be generated by the terminal 10aa if the reservation ID uniquely identifies the meeting reservation. Further, the store/read processing unit 59 associates the reservation ID with the terminal ID and the updated destination name data and stores the same in the reservation terminal management table (FIG. 11B) (step S43).

Figure 19:
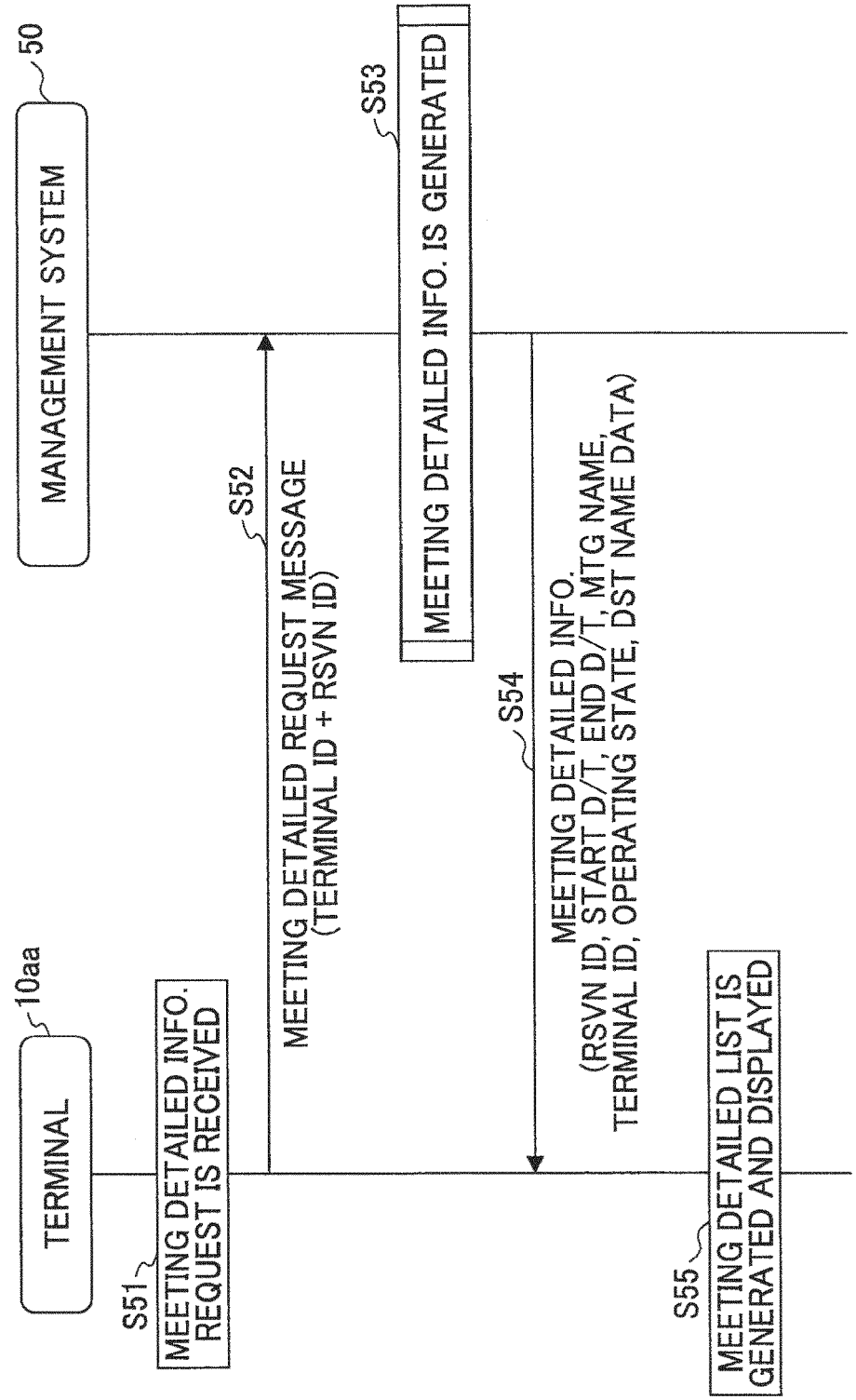
FIG. 19 is a sequence diagram for explaining a process for reading meeting detailed information.
Figure 20:
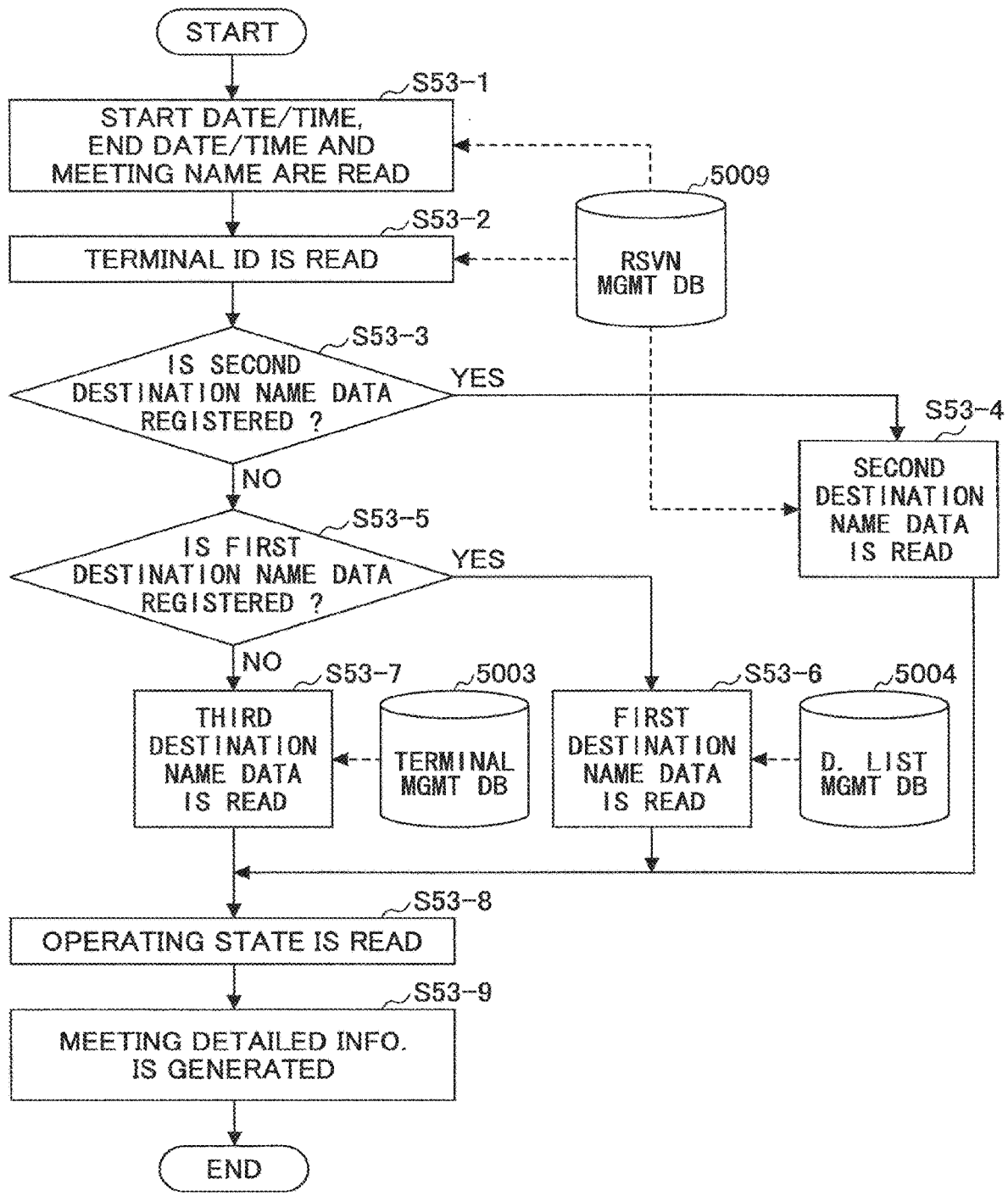
FIG. 20 is a flowchart for explaining a process for generating meeting detailed information.
Figure 22:
FIG. 22 is a conceptual diagram showing an example of a meeting detailed list.

Next, the process for requesting the management system 50 to provide the meeting detailed information of the reserved meeting before the terminal 10aa starts conducting the reserved meeting will be described with reference to FIGS. 19 to 22. The meeting detailed information includes the destination name data of the destination terminal 10 which is capable of communicating with the terminal 10aa. FIG. 19 is a sequence diagram for explaining the process for reading the meeting detailed information. FIG. 20 is a flowchart for explaining the process for generating the meeting detailed information. FIG. 21 is a conceptual diagram showing an example of the meeting detailed information. FIG. 22 is a conceptual diagram showing an example of a meeting detailed list. Note that in the process of FIG. 19, various management data is transmitted and received in the management data session "sei" shown in FIG. 2.

In the process of FIG. 19, if the user of the terminal 10aa presses the operation button 108 shown in FIG. 4 and selects the icon 311-4a corresponding to the meeting from among the icons contained in the meeting list (refer to FIG. 16), the operation input receiving unit 12 receives the request of the meeting detailed information (step S51). The transmitting/receiving unit 11 of the terminal 10aa transmits a meeting detailed request message which indicates the meeting detailed information request and contains the terminal ID of the terminal 10aa and the reservation ID (at step S27 in FIG. 13) corresponding to the selected meeting, to the management system 50 (step S52). The transmitting/receiving unit 51 of the management system 50 accepts the request of the meeting detailed information by receiving the meeting detail request message from the terminal 10aa.

Subsequently, the meeting/destination information generating unit 64 of the management system 50 generates the meeting detailed information which contains the detailed information of the destination terminal scheduled to participate in the meeting and selected by the terminal 10aa (step S53). The process for generating the meeting detailed information will be described with reference to FIG. 20.

In the process of FIG. 20, the reservation reading unit 61 searches for the reservation management table (FIG. 11A) by using the reservation ID contained in the meeting detailed request message received from the terminal 10aa as a search key, and reads the meeting name, the start date/time, and the end date/time from the reservation management table (step S53-1). Subsequently, the reservation reading unit 61 searches for the reservation terminal management table (FIG. 11B) by using the reservation ID contained in the meeting detail request message received from the terminal 10aa as a search key, and reads the terminal ID from the reservation terminal management table (step S53-2).

The terminal reading unit 54 determines whether the destination name data (second destination name data) associated with the terminal ID obtained at step S53-2 is managed in the reservation terminal management table (FIG. 11B) (step S53-3). When the destination name data is determined as being managed in the reservation terminal management table (YES of step S53-3), the terminal reading unit 54 reads the destination name data (second destination name data), associated with the reservation ID received from the terminal 10aa and the terminal ID obtained at step S53-2, from the reservation terminal management table (step S53-4).

On the other hand, when the destination name data (second destination name data) is determined as not being managed in the reservation terminal management table (NO of step S53-3), the terminal reading unit 54 determines whether the destination name data (first destination name data) associated with both the terminal ID "01aa" of the terminal 10aa as the request source terminal and the terminal ID of the destination terminal obtained at step S53-2 is managed in the destination list management table (FIG. 10) (step S53-5).

When the destination name data is determined as being managed in the destination list management table (YES of step S53-5), the terminal reading unit 54 reads the destination name data (first destination name data) associated with both the terminal ID "01aa" of the terminal 10aa as the request source terminal and the terminal ID obtained at step S53-2 from the destination list management table (step S53-6).

On the other hand, when the destination name data is determined as not being managed in the destination list management table (NO of step S53-5), the terminal reading unit 54 reads the destination name data (third destination name data) associated with the terminal ID obtained at step S53-2 from the terminal management table (FIG. 12) (step S53-7).

Subsequently, the terminal reading unit 54 searches for the terminal management table (FIG. 12) by using the terminal ID obtained at step S53-2 as a search key, and reads the operating state from the terminal management table (step S53-8).

Note that, if two or more terminal IDs associated with the reservation ID are read at step S53-2, the terminal reading unit 54 may read the destination name data associated with each of such terminal IDs by repeating the processing of the steps S53-3 to S53-8.

After the reading of the destination name data is completed, the meeting/destination information generating unit 64 generates the meeting detailed information which contains: the reservation ID; the terminal ID, the start date/time, the end date/time, the meeting name (which are obtained by the reservation reading unit 61); and the destination name data and the operating state (which are obtained by the terminal reading unit 54) (step S53-9). An example of the generated meeting detailed information is shown in FIG. 21.

Subsequently, in the process of FIG. 19, the transmitting/receiving unit 51 of the management system 50 transmits the meeting detailed information generated by the meeting/destination information generating unit 64 to the terminal 10aa (step S54). In the terminal 10aa, the transmitting/receiving unit 11 receives the meeting detailed information from the management system 50. The display control unit 16 of the terminal 10aa generates a meeting detailed list including the destination name data based on the meeting detailed information received by the transmitting/receiving unit 11, and displays the meeting detailed list on the display 120aa (step S55). An example of the displayed meeting detailed list is shown in FIG. 22.

As shown in FIG. 22, a meeting detailed list 311-6 including a list of attendant terminals (the destination name data items) is displayed. The meeting detailed list includes the start date/time, the end date/time, and the meeting name 311-7 of the corresponding meeting. The list of attendant terminals includes a plurality of destination name data items 311-2, such as "Tokyo", and a plurality of icons (311-3a, . . . , 311-3c) which indicate the operating states of the attendant terminals (the destination name data items). An entry button 311-5 used for receiving a reserved meeting communication start request from the user is displayed in the meeting detailed list 311-6. Accordingly, the terminal 10aa may receive the reserved meeting communication start request from the user when viewing the screen in which the meeting detailed list is displayed.

Figure 23:
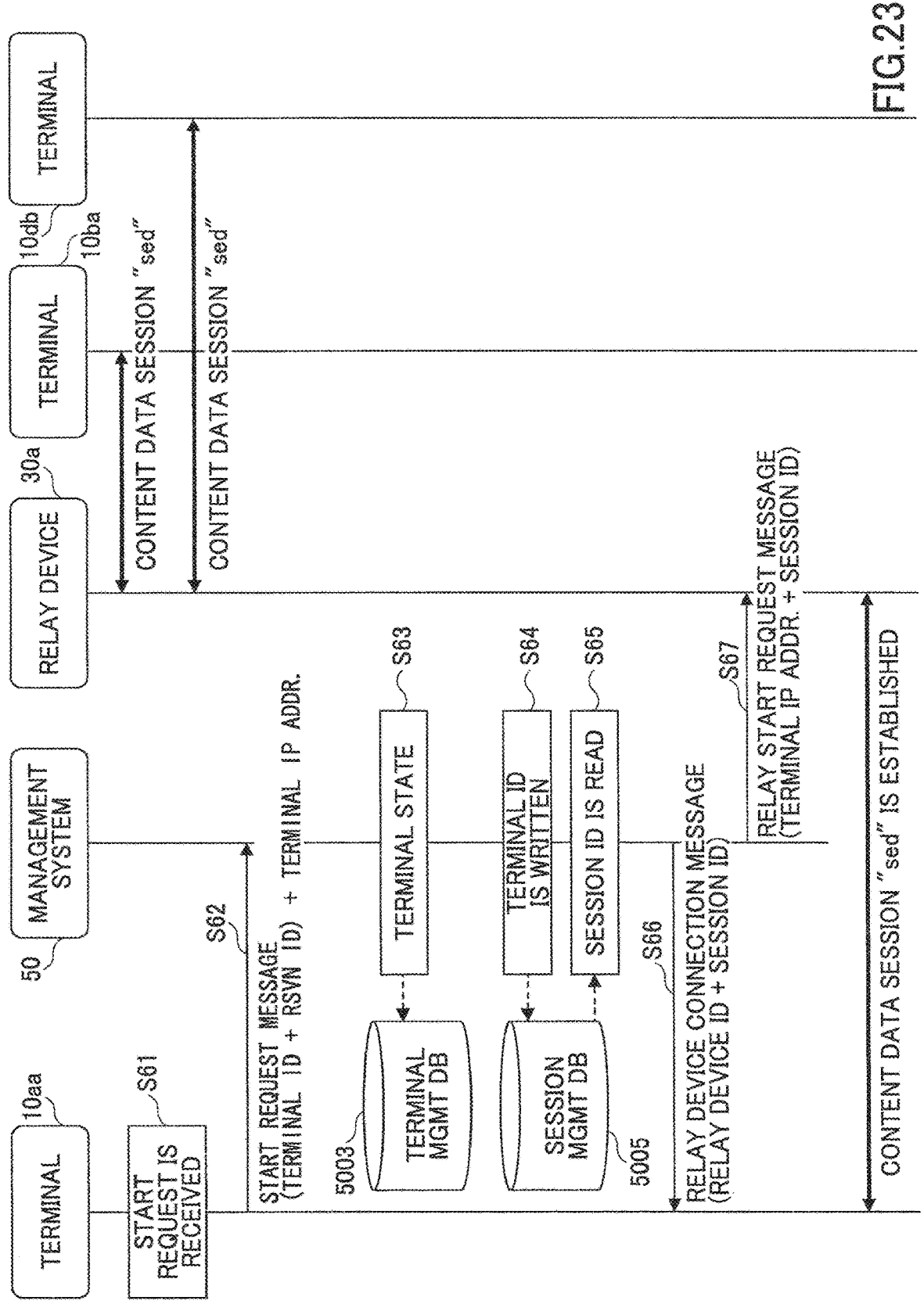
FIG. 23 is a sequence diagram for explaining a process for starting the communication.

Next, the process for starting the reserved meeting communication on the terminal 10aa will be described with reference to FIG. 23. FIG. 23 is a sequence diagram for explaining the process for starting the communication. In the process of FIG. 23, various management data is transmitted and received in the management data session "sei" shown in FIG. 2.

It is assumed that when the terminal 10aa requests the start of the reserved meeting communication, the terminal 10ba and the terminal 10db are in a state in which the reserved meeting communication is carried out through the relay device 30a in the content data session "sed" shown in FIG. 2.

In the process of FIG. 23, if the user of the terminal 10aa presses the entry button 311-5 of the meeting detailed list (FIG. 22), the operation input receiving unit 12 receives the reserved meeting communication start request (step S61).

Subsequently, the transmitting/receiving unit 11 of the terminal 10aa transmits a start request message which indicates the communication start request and contains the terminal ID "01aa" of the terminal 10aa, and the reservation ID "rsv02" received at step S54, to the management system 50 (step S62). The transmitting/receiving unit 51 of the management system 50 receives the communication start request from the terminal 10aa by the received start request message, and detects the IP address "1.2.1.3" of the terminal 10aa as the transmitter station. The state managing unit 53 of the management system 50 changes the data item in the "operating state" field of the record of the terminal management table (FIG. 12) including the terminal ID "01aa" of the terminal 10aa in the start request message to "during meeting" (step S63).

The session managing unit 57 of the management system 50 writes the terminal ID "01aa" of the terminal 10aa to the "terminal ID" field of the record of the session management table (FIG. 9) including the reservation ID "rsv02" received from the terminal 10aa (step S64). The session managing unit 57 searches for the session management table by using the reservation ID "rsv02" received from the terminal 10aa as a search key, and reads the corresponding session ID "se01" and the corresponding relay device ID "111a" from the session management data (step S65). Note that the session ID "se01" is generated by the session managing unit 57 when one of the terminals (10ba, 10db) first starts the reserved meeting communication, and such session ID is stored in the session management table. Further, note that the relay device ID "111a" is selected by the relay device selecting unit 56 when one of the terminals (10ba, 10db) first starts the reserved meeting communication, and such relay device ID is stored in the session management table by the session managing unit 57.

Subsequently, the transmitting/receiving unit 51 of the management system 50 transmits the session ID "se01" obtained at step S65 and the relay device connection message used for connecting the terminal with the relay device 30a to the terminal 10aa via the communication network 2 (step S66). The IP address of the relay device 30a, the certification information, and the port number may be included in the relay device connection message. The terminal 10aa is connected to the relay device 30a by using the relay device connection message, and transmits the content data to the relay device 30a.

Subsequently, the transmitting/receiving unit 51 of the management system 50 transmits a relay start request message indicating the relay start request to the relay device 30a (step S67). The IP address of the terminal 10aa which newly starts communication in the content data session sed, and the session ID "se01" obtained at step S65 are contained in the relay start request message. The store/read processing unit 39 of the relay device 30a stores the IP address of the terminal 10ab which newly participates in the content data session sed indicated by the session ID "se01" in the storage unit 3000. The relay unit 32 relays the content data received from the terminal 10aa to the terminals (10ba, 10db) via the transmitting/receiving unit 31 based on the IP address stored in the storage unit 3000, and relays the content data received from the terminals (10ba, 10db) to the terminal 10aa. Accordingly, the content data session sed is established between the terminals (10aa, 10ba, 10db) for transmitting and receiving the content data between the terminals (10aa, 10ba, 10db). The terminal 10aa starts the reserved meeting communication between the terminals (10ba, 10db) by the content data session.

Supplementary Information of Embodiment

According to the embodiment, the destination name data items may not be limited if the destination name data items indicate names of a destination. The destination name data items may contain information representing names relevant to the terminals 10, such as serial numbers, addresses, and phone numbers of the terminals 10, and names of regions in which the terminals 10 are arranged, or information representing names relevant to the users of the terminals 10, such as project names, team names, and user names of the terminal users.

Further, according to the embodiment, the management system 50 and the program provision system 90 may be integrated in a single computer, or various functions and units of the management system 50 and the program provision system 90 may be separately arranged in two or more computers. Moreover, if the program provision system 90 is formed in a single computer, programs transmitted by the program provision system 90 may be grouped into two or more modules or may not be grouped. Further, if the program provision system 90 is formed of two or more computers, the programs grouped into modules may be transmitted from the separate computers.

Moreover, according to the embodiment, recording media storing a terminal program, a relay device program and a transmission management system program, and the program provision system 90 including the HD 204 storing such programs may be distributed to users domestically and abroad as a program product.

Moreover, according to the embodiment, the IP addresses of the relay devices are managed by the relay device management table shown in FIG. 7 and the IP addresses of the terminals are managed by the terminal management table shown in FIG. 12. However, alternatively, respective fully qualified domain names (FQDNs) of the relay devices 30 and the terminals 10 may be managed instead of the respective IP addresses as relay device specifying information for specifying the relay devices 30 over the communication network 2 and terminal specifying information for specifying the terminals 10 over the communication network 2. In this case, a known domain name system (DNS) server may acquire the IP address corresponding to the FQDN. Note that the "relay device specifying information for specifying the relay devices 30 over the communication network 2" may be also expressed as "relay device destination information indicating destinations of the relay devices 30 over the communication network 2" or "relay device access point information indicating access points of the relay devices 30 over the communication network 2". Similarly, the "terminal specifying information for specifying the terminals 10 over the communication network 2" may also be expressed as "terminal access point information indicating access points of the terminals 10 over the communication network 2" or "terminal destination information indicating destinations of the terminals 10 over the communication network 2".

In this embodiment, the term "videoconference" and the term "teleconference" may be interchangeably used.

Further, according to the above-described embodiment, the videoconference system is described as an example of the transmission system 1. However, the transmission system 1 may not be limited to the videoconference system if the transmission system 1 is a system capable of conducting the communications with a specified destination. The transmission system 1 may be phone systems, such as Internet protocol (IP) phones or Internet phones, and other systems, such as facsimile devices, social networking service (SNS) devices, online game devices or e-mail devices. Further, the transmission system 1 may be utilized for an audio-conference system or a personal computer (PC) screen sharing system.

Figure 24:
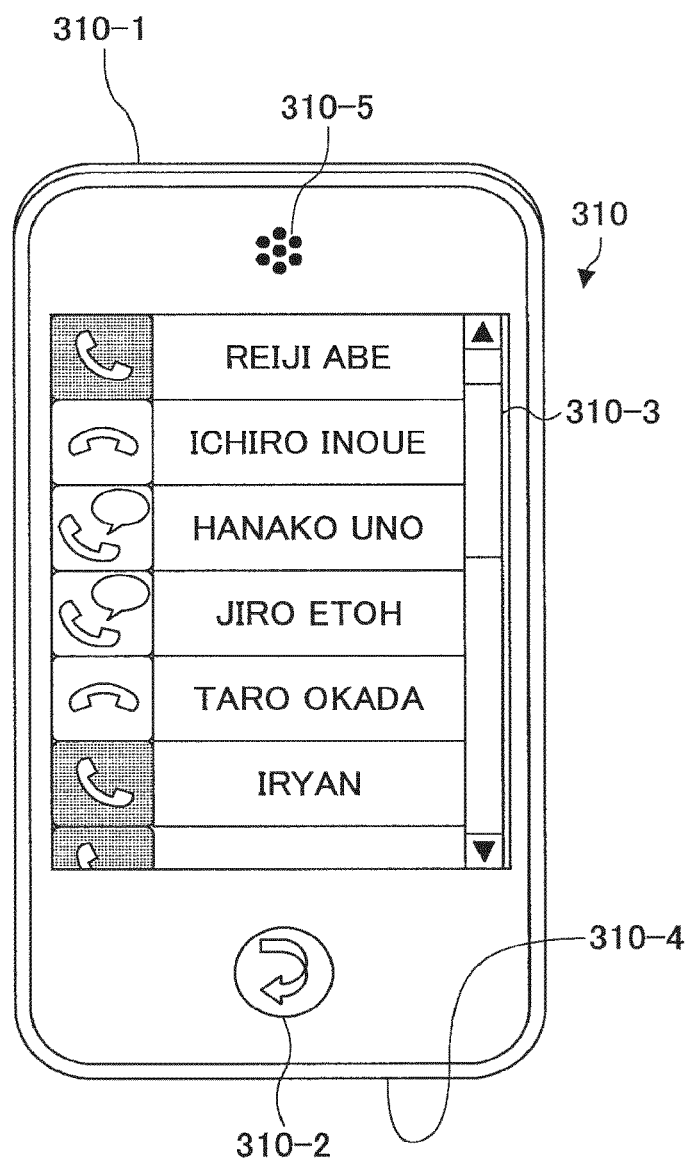
FIG. 24 is a diagram showing an example of a destination list displayed on a transmission terminal according to another embodiment.

The transmission system 1 may be a mobile phone communication system. In this case, the transmission terminal may be a mobile phone terminal. FIG. 24 shows an example of a destination list displayed on the mobile phone terminal. FIG. 24 is a conceptual diagram showing an example of a destination list displayed on the transmission terminal according to another embodiment. Specifically, the mobile phone terminal as the terminal 310 includes a main body 310-1, a menu screen display button 310-2 arranged in the main body 310-1, a display unit 310-3 arranged in the main body 310-1, a microphone 310-4 provided in a lower part of the main body 310-1, and a speaker 310-5 provided in a surface of the main body 310-1. Among these, the "menu screen display button" 310-2 is utilized for displaying a menu screen on which icons of various applications are displayed. The display unit 310-3 is formed of a touch panel on which the user touches with a finger or hand to select a desired destination name data item in order to communicate with a person of another mobile phone terminal of the selected destination name data item.

Further, according to the embodiment, the videoconference is implemented by the transmission system 1. However, the transmission system 1 may not be limited to the videoconference system. The transmission system 1 may be utilized for a preliminary meeting, a general conversation between family members or friends, or one-way presentation of information.

Major Effects of Embodiment

As described above, in the transmission system according to the embodiment, the destination name data managing unit 5010 is configured to manage two or more destination name data items indicating names of a destination in the communications between the terminals 10. The terminal reading unit 54 is configured to read at least one destination name data item from among the destination name data items. The transmitting/receiving unit 51 is configured to transmit the read destination name data item to a terminal 10 which is capable of communicating with the destination. In this case, the destination name data managing unit 5010 is able to manage the plural destination name data items according to the communications with respect to the single destination, and it is possible to provide an appropriate destination name data item for the communications.

Further, according to the embodiment, the plurality of first destination name data items are associated with the terminal IDs of the terminals 10 as the request source terminals and such data items associated with the terminal IDs are managed in the destination list management table (FIG. 10). The terminal reading unit 54 is configured to read from the destination list management table a first destination name data item (e.g., "Company B, Washington D.C.") associated with a terminal ID (e.g., "01aa") of a request source terminal. The transmitting/receiving unit 51 is configured to transmit the first destination name data item to the terminal 10 (e.g., the terminal 10*aa*) which is the request source terminal. Accordingly, a plurality of easy-to-specify destination name data items of one destination on the request source terminal may be managed in the destination list management table per request source terminal, and the management system 50 may provide one of the plurality of easy-to-specify destination name data items for the request source terminal.

Moreover, according to the embodiment, the plurality of second destination name data items are associated with the reservation IDs and such data items associated with the reservation IDs are managed in the reservation terminal management table (FIG. 11B). The terminal reading unit 54 is configured to read from the reservation terminal management table a second destination name data item (e.g., "Tokyo") associated with a reservation ID (e.g., "rsv02"). The transmitting/receiving unit 51 is configured to transmit the second destination name data item to the terminal 10 (e.g., the terminal 10*db*) which starts the communications relevant to the reservation. Accordingly, a plurality of easy-to-specify destination name data items of one destination on the terminal 10 which participates in the communications relevant to the reservation may be managed in the reservation terminal management table per reservation, and the management system 50 may provide one of the plurality of easy-to-specify destination name data items for the request source terminal.

Further, according to the embodiment, the terminal reading unit 54 is configured to read, when a second destination name data item is not managed in the reservation terminal management table (FIG. 11B), a first destination name data item from the destination list management table (FIG. 10). The transmitting/receiving unit 51 is configured to transmit the first destination name data item to the terminal 10 which is the request source terminal which starts the communications relevant to the reservation. Accordingly, even when the second destination name data item associated with the reservation ID is not managed, the management system 50 may read the first destination name data item and transmit the first destination name data item to the terminal 10 as the request source terminal.

In addition, according to the embodiment, the third destination name data items are managed in the terminal management table (FIG. 12). Accordingly, even when the destination name data item relevant to the request source terminal or the destination name data item relevant to the reservation is not managed, the management system 50 may read the third destination name data item and transmit the third destination name data item to the terminal 10 as the request source terminal.

Further, according to the embodiment, the plurality of destination name data items may contain information representing names relevant to the terminals 10, such as serial numbers, addresses, and phone numbers of the terminals 10, and names of regions in which the terminals 10 are arranged, or information representing names relevant to the users of the terminals 10, such as project names, team names, and user names of the terminal users. Accordingly, the flexibility of selection of the destination name data items when specifying the name of the destination may be increased.

As described above, in the transmission system according to the embodiment, the transmission management system manages a plurality of destination name data items which indicate a plurality of names of a single destination in the communications between the transmission terminals, reads at least one destination name data item from among the plurality of destination name data items, and transmits the destination name data item to a transmission terminal capable of communicating with the destination. In this case, the transmission management system is able to manage the plural destination name data items according to the communications with respect to the single destination, and it is possible to provide an appropriate destination name data item for the communications.

The transmission management system according to the invention is not limited to the above embodiments and various variations and modifications may be made without departing from the scope of the present invention.

The present application is based on and claims the benefit of priority of Japanese Patent Application No. 2012-171192, filed on Aug. 1, 2012, the entire content of which are hereby incorporated by reference.

The invention claimed is:

1. A system, comprising:
one or more memories to store:
    identification information to be used upon logging in to the system,
    first name information which indicates a first name associated with the identification information, and
    communication information relating to a communication session; and
processing circuitry configured to:
    transmit, via a network, the first name information to a transmission terminal that has logged in to the system based on the identification information so that the transmission terminal displays the first name indicated by the first name information;
    receive, via the network from the transmission terminal, second name information, the second name information being a second name displayed during a communication session established based on the communication information; and
    store, in the one or more memories, the second name information received from the transmission terminal in association with the communication information.

2. The system as claimed in claim 1, wherein:
the first name information or the second name information is information based on the transmission terminal or information based on a user of the transmission terminal.

3. The system as claimed in claim 1, wherein:
the first name information stored in the one or more memories is information based on a request for registering name information from the transmission terminal.

4. The system as claimed in claim 1, wherein:
the second name information transmitted to the transmission terminal is name information associated with another transmission terminal in a state of participating on the communication session established based on the communication information.

5. The system as claimed in claim 1, wherein:
the communication information includes at least a meeting name, start date/time, and end date/time.

6. The system as claimed in claim 1, wherein:
the system includes one or more computer.

7. The system as claimed in claim 1, wherein:
the processing circuitry receives the second name information before the communication session which is a scheduled communication session is started.

8. The system as claimed in claim 1, wherein:
updated name information of the first name information is name information that is to be displayed instead of displaying the first name information.

9. A method, comprising:
transmitting, via a network, first name information to a transmission terminal that has logged in based on identification information so that the transmission terminal displays the first name indicated by the first name information, the first name information indicating a first name associated with the identification information;
receiving, via the network from the transmission terminal, second name information, the second name information being a second name displayed during a communication session established based on communication information which relates to the communication session; and storing, in one or more memories, the second name information received from the transmission terminal in association with the communication information.

10. The method as claimed in claim 9, wherein:
the first name information or the second name information is information based on the transmission terminal or information based on a user of the transmission terminal.

11. The method as claimed in claim 9, wherein:
the first name information is information based on a request for registering name information from the transmission terminal.

12. The method as claimed in claim 9, wherein:
the second name information transmitted to the transmission terminal is name information associated with another transmission terminal in a state of participating on the communication session established based on the communication information.

13. The method as claimed in claim 9, wherein:
the communication information includes at least a meeting name, start date/time, and end date/time.

14. The method as claimed in claim 9, wherein:
the transmitting, receiving and storing are performed by one or more computer.

15. The method as claimed in claim 9, wherein:
the receiving of the second name information is performed before the communication session which is a scheduled communication session is started.

16. The method as claimed in claim 9, wherein:
updated name information of the first name information is name information that is to be displayed instead of displaying the first name information.

17. A system, comprising:
a transmission terminal; and
a device, including:
one or more memories to store:
identification information to be used upon logging in to the system, first name information which indicates a first name associated with the identification information, and communication information relating to a communication session; and
first processing circuitry configured to:
transmit, via a network, the first name information to the transmission terminal that has logged in to the system based on the identification information, so that the transmission terminal displays the first name indicated by the first name information;
receive, via the network from the transmission terminal, second name information, the second name information being a second name displayed during a communication session established based on the communication information; and
store, in the one or more memories, the second name information received from the transmission terminal in association with the communication information.

18. The system as claimed in claim 17, wherein:
the first name information or the second name information is information based on the transmission terminal or information based on a user of the transmission terminal.

19. The system as claimed in claim 17, wherein:
the transmission terminal includes second circuitry configured to:
display the first name indicated by the first name information and an icon to update the first name to the second name.

* * * * *